United States Patent
Park et al.

(10) Patent No.: US 10,103,849 B2
(45) Date of Patent: Oct. 16, 2018

(54) METHOD OF TRANSMITTING OR RECEIVING UPLINK CONTROL INFORMATION IN WIRELESS COMMUNICATION SYSTEM AND APPARATUS FOR THE SAME

(71) Applicant: LG Electronics Inc., Seoul (KR)

(72) Inventors: Hanjun Park, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 106 days.

(21) Appl. No.: 15/235,200

(22) Filed: Aug. 12, 2016

(65) Prior Publication Data

US 2017/0048026 A1    Feb. 16, 2017

Related U.S. Application Data

(60) Provisional application No. 62/204,485, filed on Aug. 13, 2015, provisional application No. 62/251,649, filed on Nov. 5, 2015.

(51) Int. Cl.
| | |
|---|---|
| *H04W 4/00* | (2018.01) |
| *H04L 1/18* | (2006.01) |
| *H04L 5/00* | (2006.01) |

(52) U.S. Cl.
CPC .......... *H04L 1/1893* (2013.01); *H04L 1/1812* (2013.01); *H04L 5/0055* (2013.01)

(58) Field of Classification Search
USPC .................................................. 370/329, 280
See application file for complete search history.

(56) References Cited

U.S. PATENT DOCUMENTS

| | | | | |
|---|---|---|---|---|
| 9,681,326 | B2 * | 6/2017 | He .................... | H04W 28/0205 |
| 2016/0100422 | A1 * | 4/2016 | Papasakellariou .... | H04L 1/1861 370/329 |
| 2016/0295561 | A1 * | 10/2016 | Papasakellariou .. | H04W 72/042 |
| 2017/0041923 | A1 * | 2/2017 | Park ..................... | H04L 1/1822 |

* cited by examiner

*Primary Examiner* — Phuongchau Ba Nguyen
(74) *Attorney, Agent, or Firm* — Morgan, Lewis & Bockius LLP

(57) ABSTRACT

Disclosed herein is a method of transmitting uplink control information by a user equipment (UE) in which a plurality of cells are configured including receiving downlink data through at least one of the cells, and piggybacking hybrid automatic repeat and request (HARQ)-acknowledgement (ACK) information about the downlink data on a physical uplink shared channel (PUSCH) and transmitting the same. The HARQ-ACK information may be generated for one cell-group of a plurality of cell-groups configured based on the plurality of cells, and the one cell-group selected for generating the HARQ-ACK information may be indicated through cyclic redundancy check (CRC) attached to the HARQ-ACK information.

6 Claims, 17 Drawing Sheets

FIG. 2
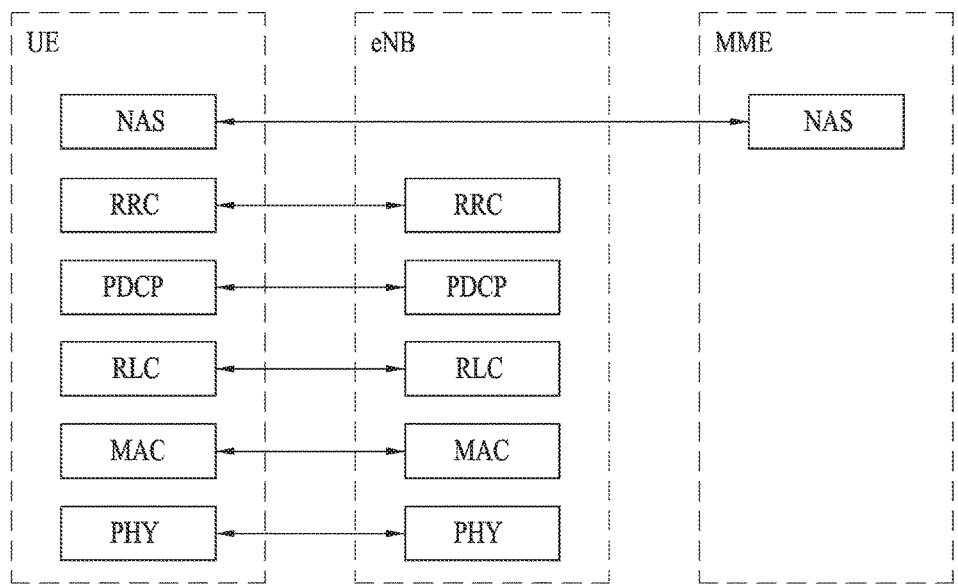
(a) Control-plane protocol stack
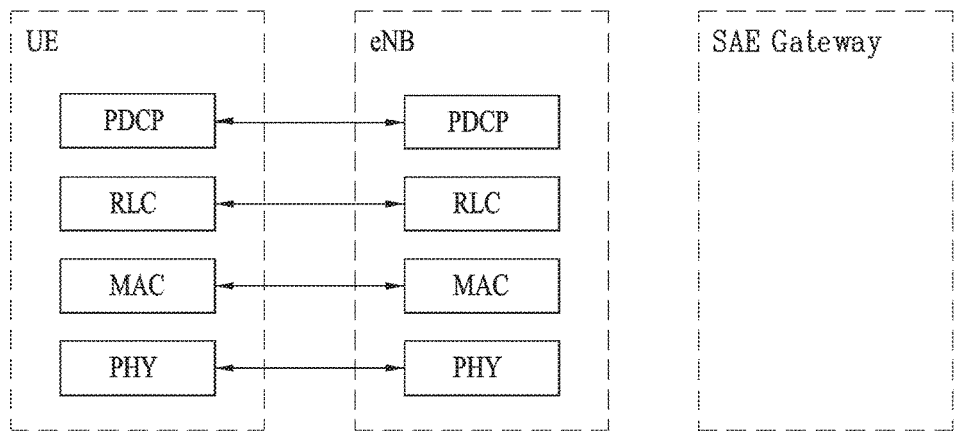
(b) User-plane protocol stack FIG. 8
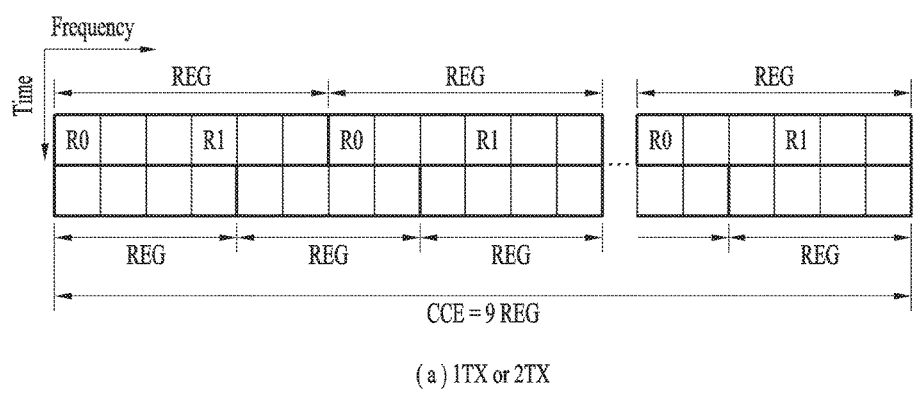
(a) 1TX or 2TX
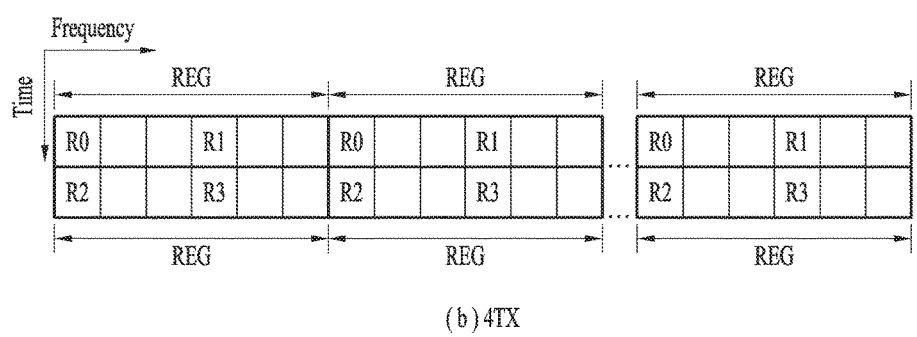
(b) 4TX

METHOD OF TRANSMITTING OR RECEIVING UPLINK CONTROL INFORMATION IN WIRELESS COMMUNICATION SYSTEM AND APPARATUS FOR THE SAME

This application claims the benefit of U.S. Provisional Application No. 62/204,485 filed on Aug. 13, 2015, and U.S. Provisional Application No. 62/251,649 filed on Nov. 5, 2015, all of which are hereby incorporated by reference as if fully set forth herein.

BACKGROUND OF THE INVENTION

Field of the Invention

The present invention relates to a wireless communication system, more particularly, to a method of transmitting or receiving uplink control information by piggybacking uplink control information on a data resource in a wireless communication environment in which multiple cells are configured and an apparatus for the same.

Discussion of the Related Art

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

SUMMARY OF THE INVENTION

Accordingly, the present invention is directed to a method of transmitting or receiving uplink control information in a wireless communication system and an apparatus for the same that substantially obviates one or more problems due to limitations and disadvantages of the related art.

An object of the present invention is to provide a method of more efficiently transmitting or receiving HARQ-ACK information resource by adaptively configuring payload of the HARQ-ACK information piggybacking on a PUSCH in a wireless communication environment in which multiple cells are configured and an apparatus for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting uplink control information by a user equipment (UE) in which a plurality of cells are configured includes receiving downlink data through at least one of the cells, and piggybacking hybrid automatic repeat and request (HARQ)-acknowledgement (ACK) information about the downlink data on a physical uplink shared channel (PUSCH) and transmitting the same, wherein the HARQ-ACK information is generated for one cell-group of a plurality of cell-groups configured based on the plurality of cells, wherein the one cell-group selected for generating the HARQ-ACK information is indicated through cyclic redundancy check (CRC) attached to the HARQ-ACK information.

In another aspect of the present invention, there is provided a user equipment (UE) in which a plurality of cells are configured, including a receiver configured to receive downlink data through at least one of the cells, a transmitter configured to piggyback HARQ-ACK information about the downlink data on a physical uplink shared channel (PUSCH) and transmit the same, and a processor configured to control the receiver and the transmitter, wherein the HARQ-ACK information is generated for one cell-group of a plurality of cell-groups configured based on the plurality of cells, wherein the one cell-group selected for generating the HARQ-ACK information is indicated through cyclic redundancy check (CRC) attached to the HARQ-ACK information.

In another aspect of the present invention, there is provided a method of receiving uplink control signal by a base station, the method including transmitting downlink data through at least one of a plurality of cells configured for a user equipment (UE), and receiving HARQ-ACK information about the downlink data piggybacked to a physical uplink shared channel (PUSCH), wherein the HARQ-ACK information is generated for one cell-group of a plurality of cell-groups configured based on the plurality of cells, wherein the one cell-group selected for generating the HARQ-ACK information is indicated through cyclic redundancy check (CRC) attached to the HARQ-ACK information.

Preferably, the one cell-group has a smallest size from among cells-groups having all cells through which the downlink data is received.

Preferably, different cell-groups having the same number of cells among the plurality of cell-groups may be distinguished from each other by applying a cell-group specific CRC mask to the CRC of the HARQ-ACK information.

Preferably, the CRC may be attached to the HARQ-ACK information when the number of the cells configured for the UE is greater than or equal to a first threshold, a payload size of the HARQ-ACK information is greater than or equal to a second threshold, or a coding rate of the HARQ-ACK information is greater than or equal to a third threshold.

Preferably, the one cell-group may be selected based on a downlink assignment index (DAI) included in downlink control information for scheduling the downlink data. More preferably, the one cell-group may be a cell-group having a smallest size among cell-groups for each the number of the cells being greater than or equal to a number indicated by a value of the DAI.

Preferably, the cell-groups may be configured to have different HARQ-ACK payload sizes. More preferably, the cell-groups may have a nested structure.

Preferably, a channel coding scheme may be determined according to a sum of a payload size of the HARQ-ACK information and a size of the CRC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and E-UTRAN based on the 3GPP radio access network standard;

FIG. 8 illustrates a UL HARQ operation in an LTE system.

DETAILED DESCRIPTION OF THE INVENTION

Figure 1:
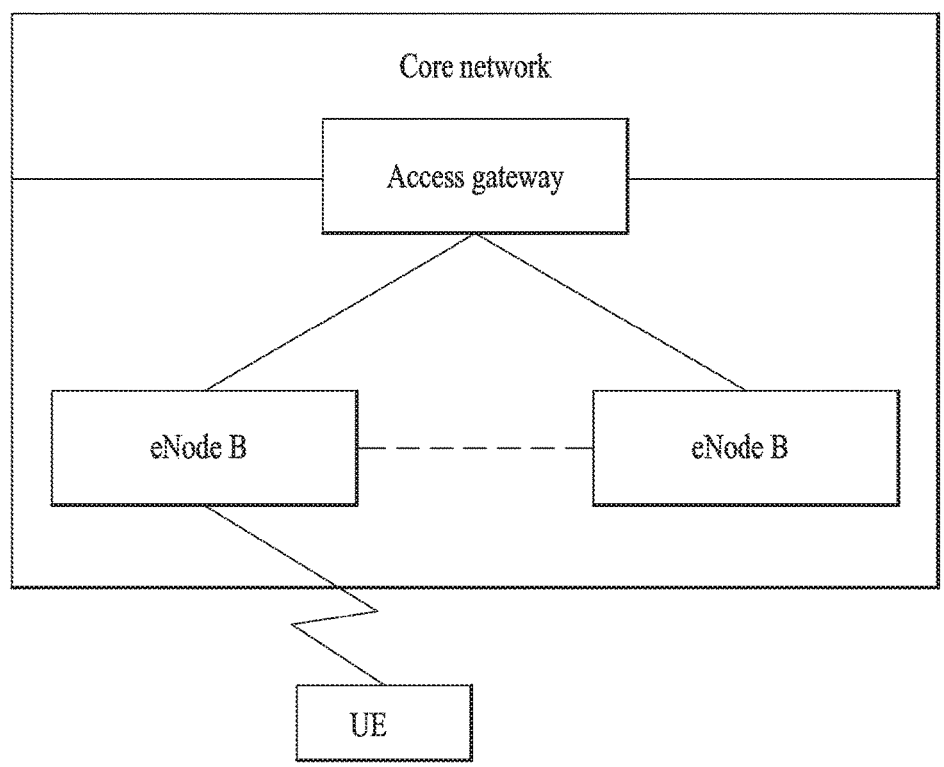
FIG. 1 is a schematic diagram of E-UMTS network structure as one example of a wireless communication system.

Reference will now be made in detail to the preferred embodiments of the present invention, examples of which are illustrated in the accompanying drawings. Wherever possible, the same reference numbers will be used throughout the drawings to refer to the same or like parts.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
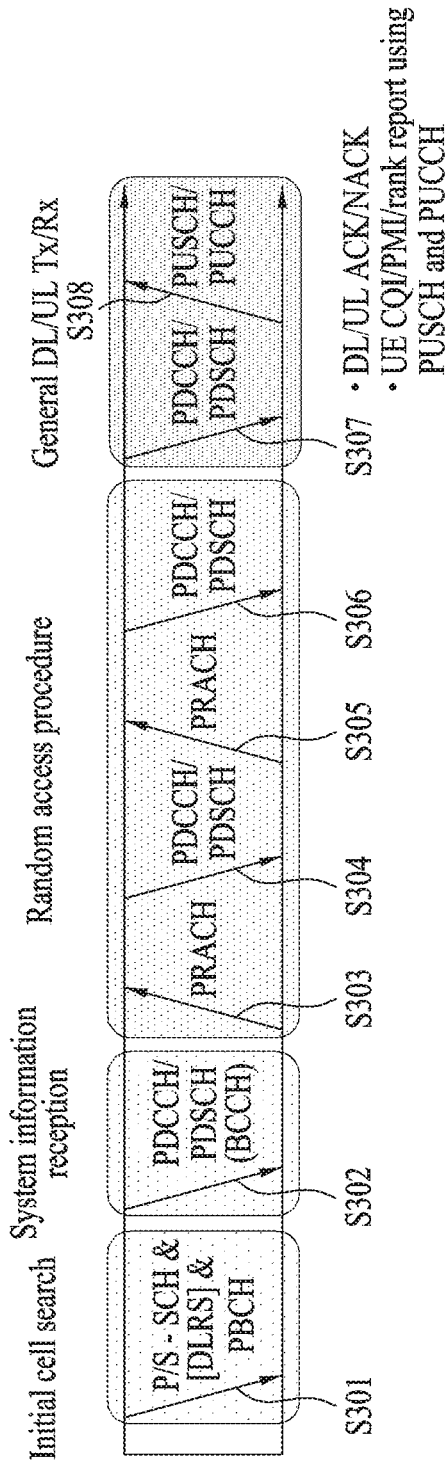
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
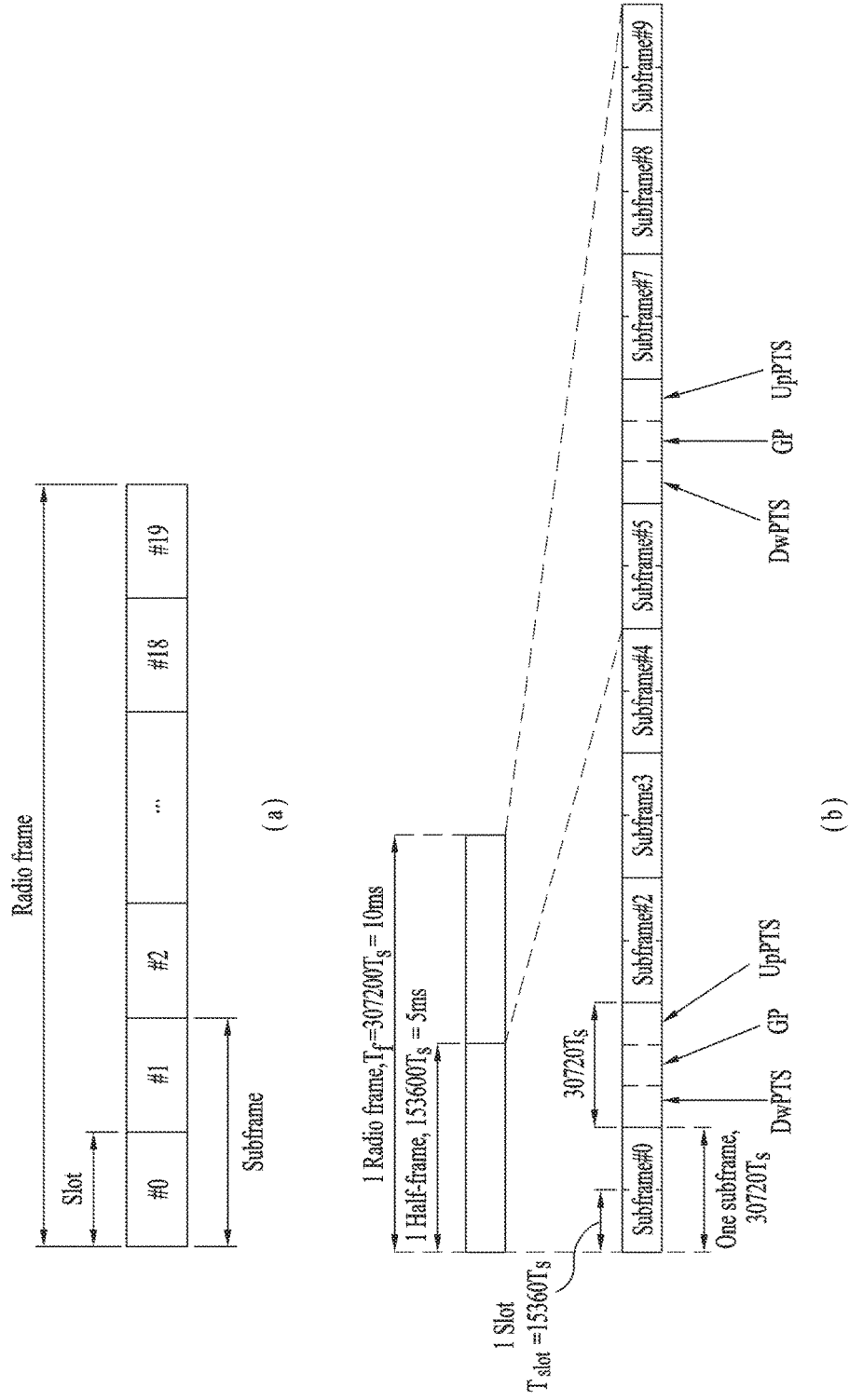
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 3 shows an uplink (UL) ACK/NACK timeline. If the UE receives a PDCCH and a PDSCH scheduled by the PDCCH from the eNB in subframe #(n-k), the UE transmits UL ACK/NACK for the received PDSCH in subframe #n.

In addition, ACK/NACK of the PDSCH is transmitted over a PUCCH, which is a UL control channel. In this case, the information transmitted over the PUCCH depends on the format. This operation is summarized below.

In LTE, PUCCH resources for ACK/NACK are not pre-allocated to each UE, but are divided and used for multiple UEs at each time. Specifically, PUCCH resources used for a UE to transmit ACK/NACK are implicitly determined on the basis of a PDCCH that carries scheduling information about a PDSCH carrying the corresponding DL data. The entire region through which a PDCCH is transmitted in each DL subframe consists of a plurality of control channel elements (CCEs), and the PDCCH transmitted to the UE consists of one or more CCEs. Each CCE includes a plurality of resource element groups (REGs) (e.g., 9 REGs). One REG consists of 4 REs which neighbor each other with a reference signal (RS) excluded. The UE transmits ACK/NACK through implicit PUCCH resources that are derived or calculated by a function of a specific CCE index (e.g., the first or lowest CCE index) from among CCEs constituting a PDCCH received by the UE.

Herein, each PUCCH resource index may correspond to a PUCCH resource for ACK/NACK. For example, when it is assumed that PDSCH scheduling information is transmitted to the UE over a PDCCH consisting of CCEs #4 to #6, the UE transmits ACK/NACK to the BS through a PUCCH, for example, PUCCH #4 derived or calculated from a CCE having the lowest index (i.e., the index of CCE #4) constituting the PDCCH.

PUCCH format 1a/1b may be used to transmit A/N information, PUCCH format 2/2a/2b may be used to transmit CQI information or CQI+A/N information, and PUCCH format 3 may be used to transmit (multiple pieces of) A/N information.

The radio frame structures described above are simply illustrative, and various modifications may be made to the number of subframes included in a radio frame, the number of slots included in a subframe, or the number of symbols included in a slot.

Figure 5:
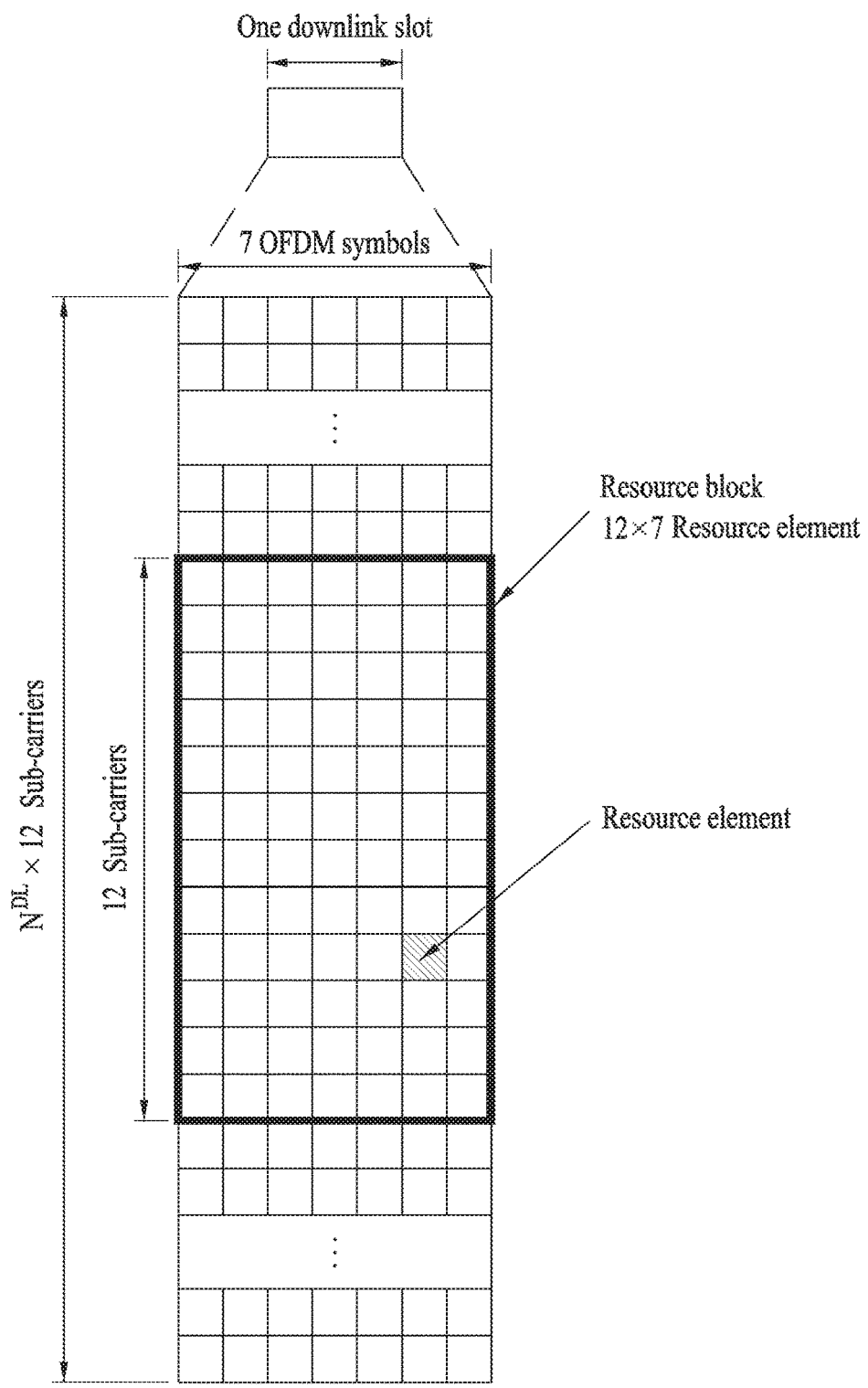
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
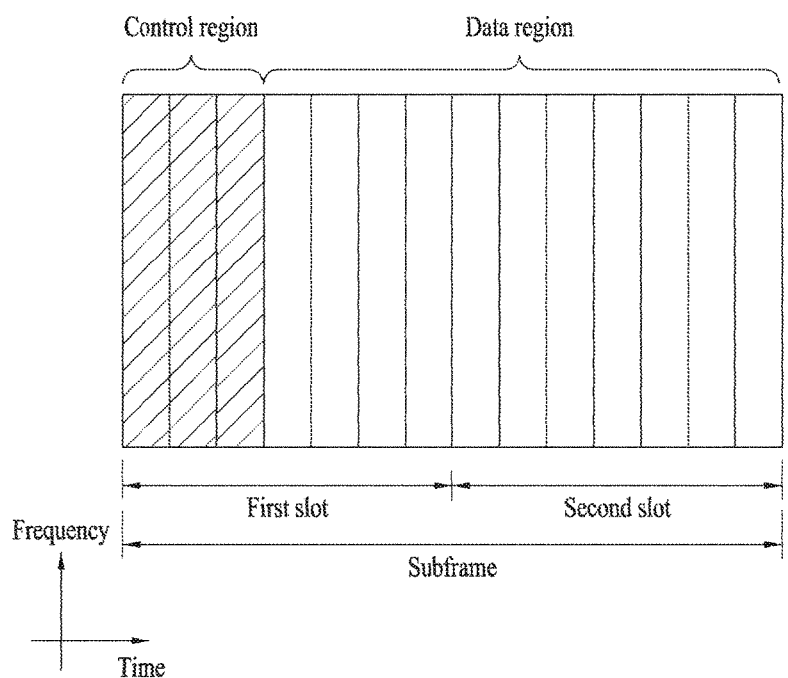
FIG. 6 is a diagram of an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
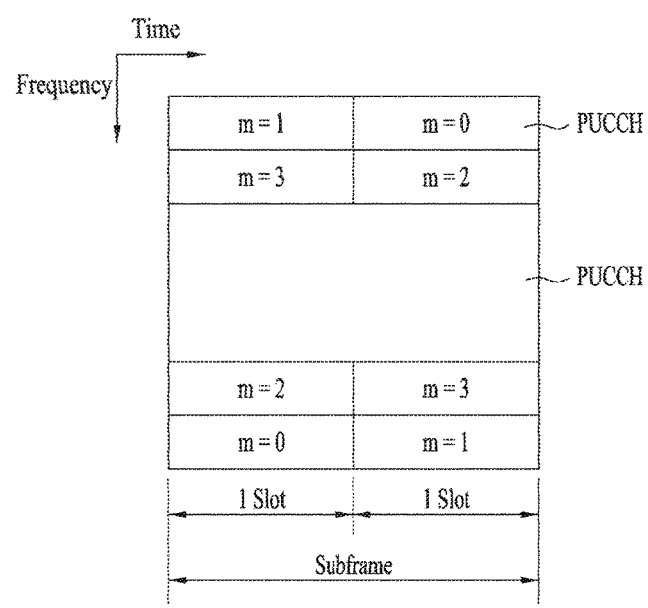
FIG. 7 is a diagram of an example of a structure of an uplink subframe in LTE.

FIG. 7 is a diagram of an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

FIG. 8 shows resource units used to configure a downlink control channel in an LTE system. In particular, FIG. 8(a) illustrates a case where a base station has one or two transmit antennas, and FIG. 8(b) illustrates a case where a base station has four transmit antennas. In these two cases, the same method of configuring a resource unit in relation to a control channel is used, while different reference signal (RS) patterns are used according to the number of transmit antennas.

Referring to FIG. 8, the basic resource unit of a downlink control channel is a resource element group (REG). One REG consists of 4 REs which neighbor each other with an RS excluded. Each REG is indicated by bold lines in the figure. A PCFICH includes 4 REGs and a PHICH includes 3 REGs. A PDCCH is configured in units of control channel element (CCE), and one CCE includes 9 REGs.

A UE is configured to check $M^{(L)}$ ($\geq L$) CCEs which are consecutive or arranged according to a specific rule, in order to check whether or not a PDCCH consisting of L CCEs is transmitted thereto. The value of L which the UE needs to consider in receiving the PDCCH may be greater than 1. CCE sets that the UE needs to check to receive a PDCCH are called a search space. For example, LTE systems define the search space as shown in Table 4 below.

TABLE 4

| Type | Search space $S_k^{(L)}$ | | Number of PDCCH candidates $M^{(L)}$ |
|------|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Herein, the CCE aggregation level L denotes the number of CCEs constituting a PDCCH, $S_k^{(L)}$ denotes the search space of CCE aggregation level L, and $M^{(L)}$ denotes the number of candidate PDCCHs that need to be monitored in the search space of the aggregation level L.

The search space may be divided into a UE-specific search space which allows only access of a specific UE, and a common search space which allows access of all UEs in a cell. The UE monitors common search spaces having CCE aggregation levels 4 and 8 and UE-specific search spaces having CCE aggregation levels 1, 2, 4 and 8. A common search space may overlap a UE-specific search space.

In a PDCCH search space assigned to a UE for each CCE aggregation level value, the position of the first CCE (a CCE having the lowest index) changes in each subframe depending on the UE. This is called PDCCH search space hashing.

CCEs may be distributed over a system band. More specifically, a plurality of logically consecutive CCEs may be input to an interleaver, which functions to mix the input CCEs on an REG-by-REG basis. Accordingly, frequency/time resources constituting one CCE are physically distributed in the whole frequency/time domain within a control region of a subframe. In other words, interleaving is performed on an REG-by-REG basis although a control channel is configured in units of CCE. Thereby, frequency diversity and interference randomization gain may be maximized.

Figure 9:
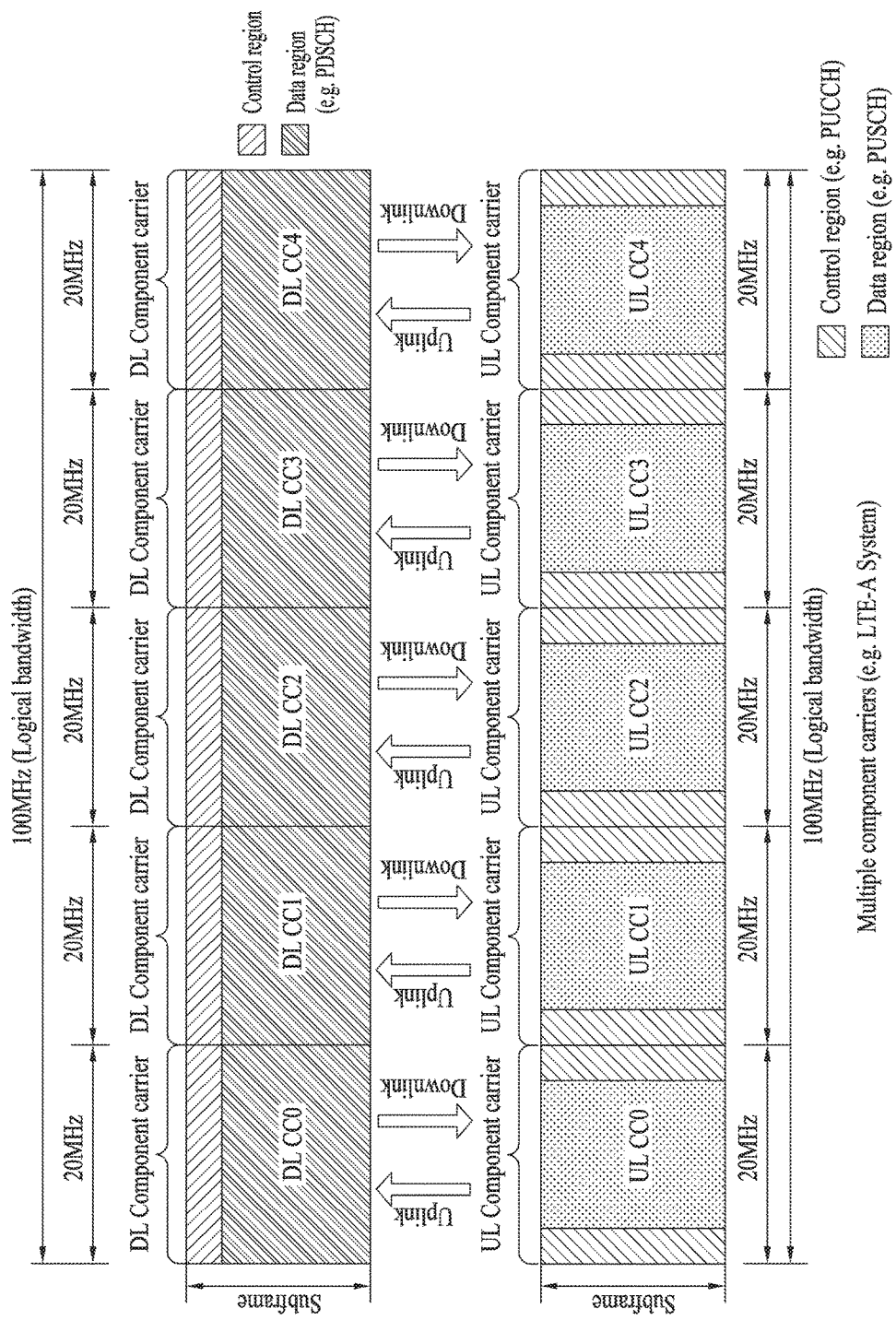
FIG. 9 is a diagram illustrating a DL/UL HARQ timeline in an FDD system.

FIG. 9 is a diagram of an example of a carrier aggregation (CA) communication system.

Referring to FIG. 9, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As an example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, introduction of a CIF (carrier indicator field) can be considered. Whether a CIF exists or not within a PDCCH can be semi-statically and user-specifically (or user group-specifically) configured via an upper layer signaling (e.g., RRC signaling).

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 10:
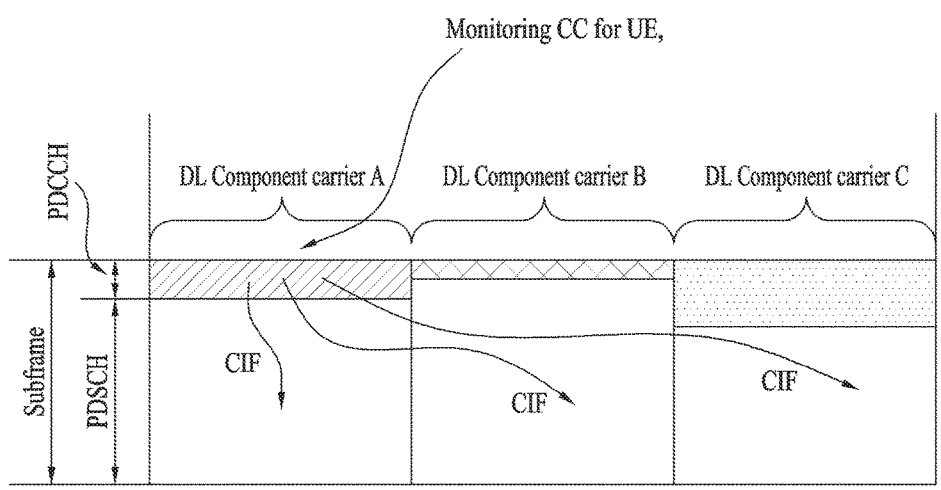
FIG. 10 is a diagram illustrating scheduling performed when a plurality of carriers is aggregated.

FIG. 10 is a diagram illustrating scheduling performed when a plurality of carriers is aggregated. Assume that 3 DL CCs are aggregated with each other and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE group-specific or cell-specific) upper layer signaling, the DL CC A (monitoring DL CC) may be able to transmit the PDCCH, which schedules the PDSCH of a different DL CC, as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

Hereinafter, a description will be given of hybrid automatic repeat and request (HARQ) in a wireless communication system.

When there are multiple UEs having data to be transmitted on uplink/downlink in a wireless communication system, a BS selects a UE to transmit data in every transmission time interval (TTI) (e.g., a subframe). In particular, in a system having multiple carriers and operated in a similar manner, the BS selects a UE to transmit data on uplink/downlink in each TTI, and also selects a frequency band for the selected UE to use to transmit data.

This operation will be described in terms of uplink. UEs transmit RSs (or pilot signals) on UL. The eNB checks the channel states of the UEs based on the received RSs and selects, in every TTI, a UE that will transmit data on UL in each unit frequency band. The eNB indicates the result of selection to the UE. That is, in a specific TTI, the eNB transmits to the UL-scheduled UE a UL assignment message instructing data transmission in a specific frequency band. The UL assignment message is also referred to as a UL grant. The UE transmits data on UL according to the UL assignment message. The UL assignment message basically includes a UE identity (ID), RB allocation information, and information about payload and the like, and may further include an Incremental Redundancy (IR) version and a New Data Indication (NDI).

In synchronous non-adaptive HARQ, when a UE scheduled for a specific time retransmits data, the retransmission time is set for the UE by the system (e.g., 4 subframes after reception of a NACK signal). Accordingly, the eNB only needs to transmit a UL grant message to the UE at the time of initial transmission and transmits an ACK/NACK signal for a subsequent retransmission. On the other hand, in asynchronous adaptive HARQ, a retransmission time is not agreed upon between a UE and an eNB, and accordingly the eNB should transmit a retransmission request message to the UE. Since frequency resources or a Modulation and Coding Scheme (MCS) for retransmission vary with each transmission time, the eNB should transmit a HARQ process index, an IR version, and NDI information in addition to the UE ID, RB allocation information, and payload, when transmitting the retransmission request message.

Figure 11:
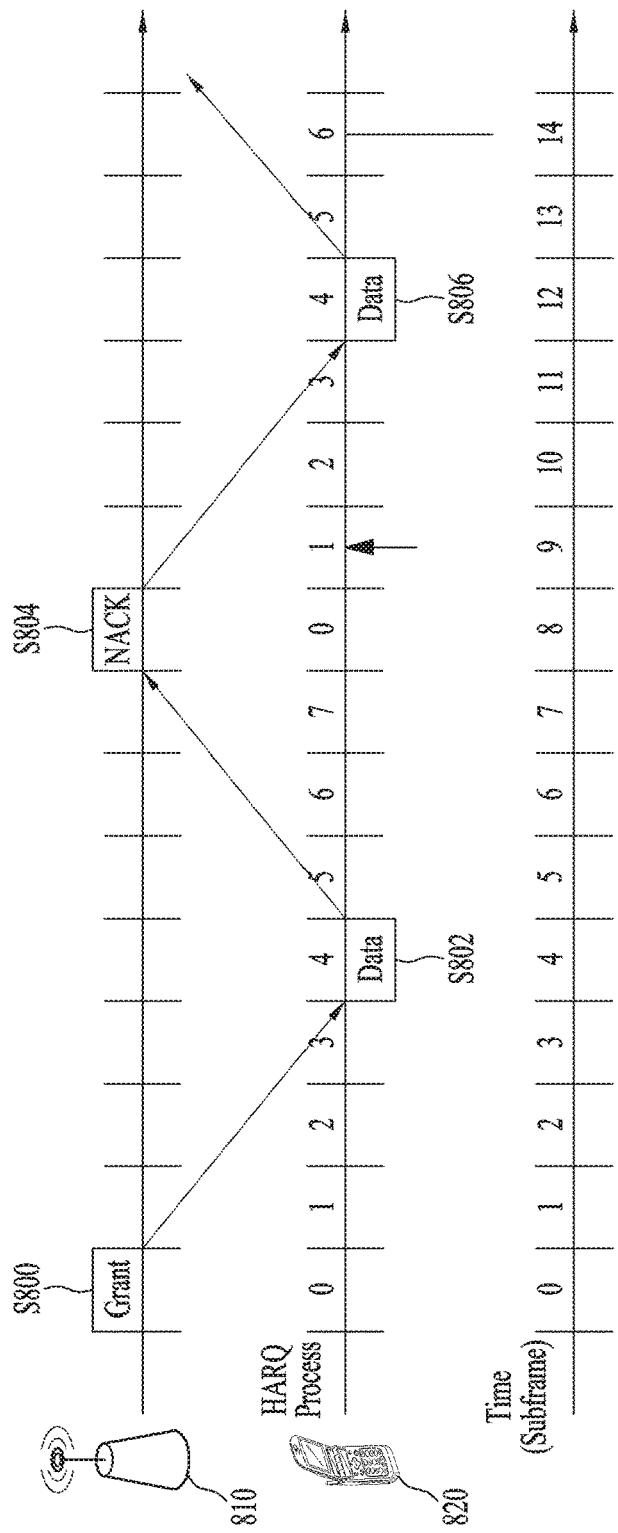
FIG. 11 illustrates a UL HARQ operation in an LTE system.

FIG. 11 illustrates a UL HARQ operation in an LTE system. The LTE system uses synchronous non-adaptive HARQ as a UL HARQ scheme. In the case of 8-channel HARQ, HARQ processes are numbered from 0 to 7. One HARQ process operates per TTI (e.g. per subframe). Referring to FIG. 11, an eNB 810 transmits a UL grant to a UE 820 on a PDCCH (S800). The UE 820 transmits UL data to the eNB 810 4 subframes (e.g., in subframe 4) after the reception time (e.g. subframe 0) of the UL grant using RBs and an MCS indicated by the UL grant (S802). The eNB 810 decodes the UL data received from the UE 820 and then generates an ACK/NACK. If decoding of the UL data fails, the eNB 810 transmits a NACK to the UE 820 (S804). The UE 820 retransmits the UL data 4 subframes after the reception time of the NACK (S806). Herein, the same HARQ processor (e.g. HARQ process 4) is responsible for the initial transmission and retransmission of the UL data.

Hereinafter, a DL/UL HARQ operation in an FDD system will be described.

Figure 12:
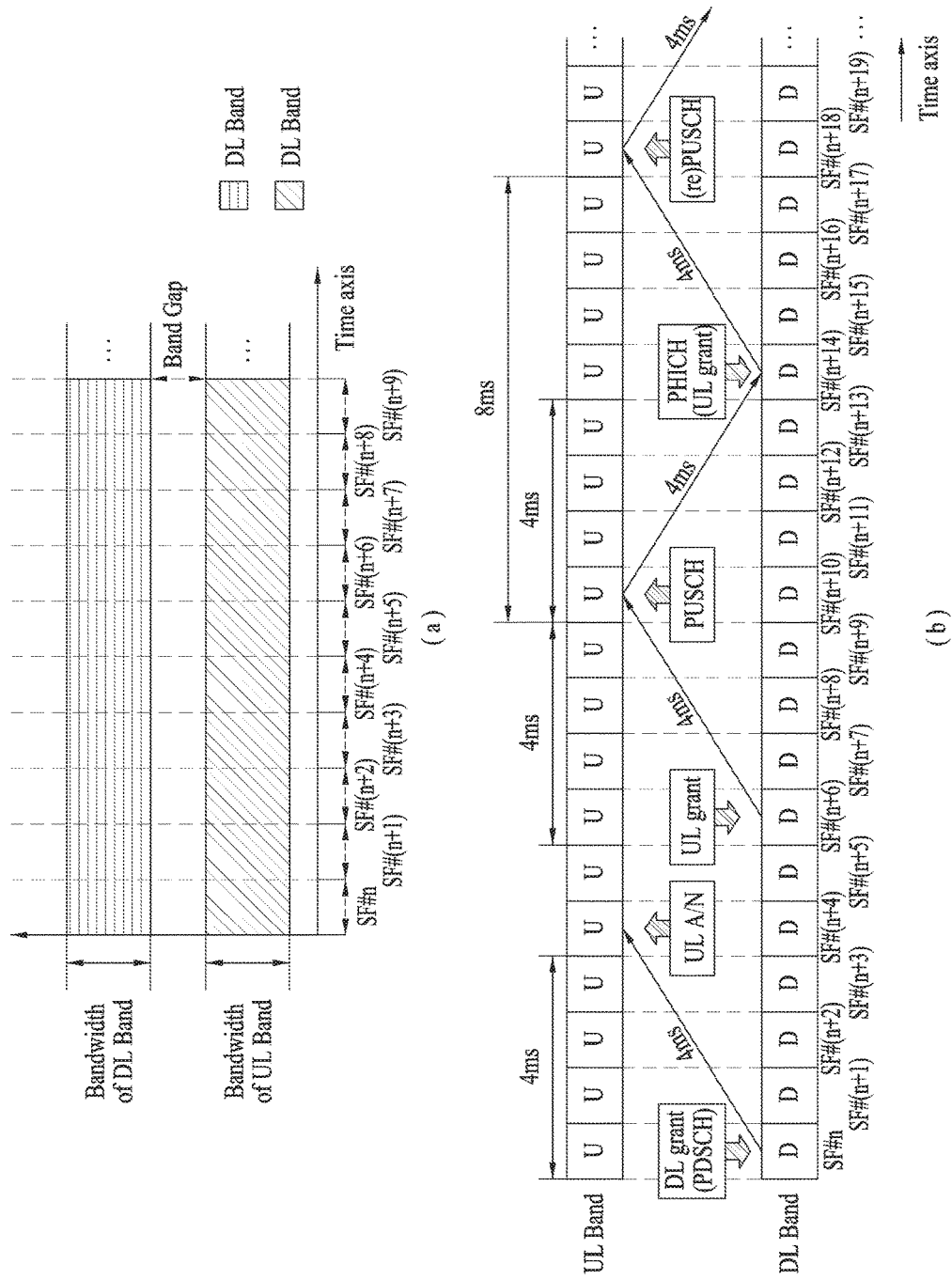
FIG. 12 illustrates an FDD system and its DL/UL HARQ timeline.

FIG. 12 illustrates an FDD system and its DL/UL HARQ timeline. As illustrated in FIG. 12(*a*), transmission/reception of DL/UL data corresponding to specific UL/DL data occurs 4 ms later in the FDD system. Referring to FIG. 12(*b*), for example, a UL ACK/NACK for a PDSCH/DL grant is transmitted 4 ms after a reception time of the PDSCH/DL grant. In addition, a PUSCH corresponding to a UL grant/PHICH is transmitted 4 ms after a reception time of the UL grant/PHICH, and a PHICH/UL grant corresponding to PUSCH transmission/retransmission is received 4 ms after the time of PUSCH transmission/retransmission.

The 3GPP LTE system uses synchronous HARQ for the UL HARQ operation and asynchronous HARQ for the DL HARQ operation. In synchronous HARQ, if initial transmission fails, retransmission takes place at a time set by the system. That is, a time for transmission/retransmission of UL data associated with a specific HARQ process or a time related to a UL grant/PHICH timeline is predefined, not subject to arbitrary change. On the contrary, in asynchronous HARQ, if initial transmission of data fails, retransmission of the data may be performed 8 ms after the initial transmission time.

In FIGS. 11 and 12, the respective HARQ processes are defined by a unique 3-bit HARQ process identifier, and individual soft buffer allocation for combination of retransmitted data is required at the reception side (i.e., the UE in the downlink HARQ process and the eNB in the uplink HARQ process).

Next, HARQ timing in an environment where a TDD cell and an FDD cell are aggregated will be described. For example, it is assumed that a TDD PCell and an FDD SCell are aggregated by carrier aggregation (CA). If the UE applies DL HARQ timing (e.g., 4 ms) defined for the legacy FDD to a PDSCH received through the FDD SCell, it may be impossible to transmit an ACK/NACK because the TDD PCell is configured for a DL subframe at the DL HARQ timing. Accordingly, new DL HARQ timing and UL HARQ timing may be defined for aggregation of the TDD cell and FDD cell, and corresponding examples are described below.

For the FDD PCell, DL HARQ Timing for the TDD SCell

In both self-scheduling and cross-carrier scheduling, HARQ timing for a PDSCH of the TDD SCell may be configured in the same manner as HARQ timing of the FDD PCell. For example, ACK/NACK information for the PDSCH of the SCell may be transmitted through the PCell.

For the FDD PCell, UL HARQ Timing for the TDD SCell

Self-scheduling: HARQ timing for a PUSCH transmitted through the SCell may be configured based on HARQ timing scheduled for the TDD cell.

Cross-carrier scheduling: (i) Similar to self-scheduling, HARQ timing for a PUSCH transmitted through the SCell may be configured based on HARQ timing scheduled for the TDD cell. Alternatively, (ii) ACK/NACK information may be received over a PHICH 6 ms after transmission of a PUSCH through the SCell. Alternatively, (iii) HARQ timing may be configured based on a reference UL-DL configuration acquired by a scheduling cell.

For the TDD PCell, DL HARQ Timing for the FDD SCell

Self-scheduling: (i) HARQ timing for a PDSCH of the SCell may be configured as timing different from the HARQ timing of the TDD PCell and timing of the TDD PCell which are based on the UL-DL configuration of the TDD PCell. Alternatively, new timing configured to have more DL subframes than HARQ timing of the legacy TDD PCell may be defined for respective UL-DL configurations of the TDD PCell. For more details, refer to Table 5 given below. Alternatively, (ii) HARQ timing for the PDSCH of the SCell may be configured based on a reference UL-DL configuration established for the FDD SCell. The reference UL-DL configuration may be determined based on the UL-DL configuration of the TDD PCell. In addition, additional HARQ timings different from the HARQ timing of the TDD PCell may be configured. For more details, refer to Tables 6, 7 and 8.

Cross carrier scheduling: HARQ timing for the PDSCH of the SCell may be configured as in the case of the aforementioned self-scheduling or in the same manner as the HARQ timing of the TDD PCell.

For the TDD PCell, UL HARQ Timing for the FDD SCell

Self-scheduling: HARQ timing for a PUSCH transmitted through the SCell may be configured as FDD HARQ timing.

Cross carrier scheduling: (i) HARQ timing for a PUSCH transmitted through the SCell may conform to HARQ timing of the TDD PCell or to FDD HARQ timing. Alternatively, for example, (ii) ACK/NACK information may be received over a PHICH 6 ms after transmission of a PUSCH through the SCell. In contrast, HARQ timing for the PUSCH may be configured as FDD HARQ timing.

Table 5 shows a specific example of case (i) of self-scheduling of DL HARQ timing (e.g., 'DL association set index') for the FDD SCell in the case of the TDD PCell.

TABLE 5

| UL-DL Conf. | HARQ timing | \multicolumn{10}{c|}{Subframe n} |
|---|---|---|---|---|---|---|---|---|---|---|---|
| | | 0 | 1 | 2 | 3 | 4 | 5 | 6 | 7 | 8 | 9 |
| 0 | 0A | — | — | 6, [5] | [5], [4] | 4 | — | — | 6, [5] | [5], [4] | 4 |
| 0 | 0B | | | 6, [5], [4] | | [5], 4 | | | 6, [5], [4] | [5], 4 | [5], 4 |
| 1 | 1 | — | — | 7, 6, [5] | [5], 4 | — | — | — | 7, 6, [5] | [5], 4 | — |
| 1 | 1* | | | 7, 6 | [6], [5], 4 | | | | 7, 6 | [6], [5], 4 | |
| 2 | 2 | — | — | 8, 7, 6, [5], 4 | — | — | — | — | 8, 7, 6, [5], 4 | — | — |
| 3 | 3 | — | — | 11, [10], [9], [8], 7, 6 | 6, 5 | 5, 4 | — | — | — | — | — |
| 3 | 3a | — | — | 11, [10], 7, 6 | [10], 6, 5 | [10], 5, 4 | | | | | |
| 4 | 4 | — | — | 12, 11, [10], [9], 8, 7 | 7, 6, 5, 4 | | | | | | |
| 4 | 4a | | | 12, 11, [10], 8, 7 | [10], 7, 6, 5, 4 | | | | | | |
| 5 | 5 | — | — | 13, 12, 11, [10], 9, 8, 7, 6, 5, 4 | — | — | — | — | — | — | — |
| 6 | 6 | — | — | [8], 7 | 7, [6] | [6], 5 | — | — | 7 | 7, [6], [5] | |
| 6 | 6* | — | — | 7 | 7, [6], [5] | 5 | — | — | 7, [6], [5], [4] | 7 | — |

In Table 5, the UL-DL configurations may be U/D configurations of the TDD PCell. DL HARQ timing for the FDD SCell may be defined with the type/index of HARQ timing associated with the TDD PCell U/D configuration. The "DL association set index" may correspond to "[ ]" in Table 5. That is, "[ ]" may denote an added DL association set index for the TDD PCell U/D configuration. For example, in the case of UL-DL configuration 0 and HARQ timing 0A, subframe #2 of the TDD PCell is used to transmit ACK/NACK for a PDSCH of the FDD SCell (i.e., subframe #6 of the previous frame) received 5 subframes before subframe #2 and ACK/NACK for a PDSCH of the FDD SCell received 6 subframes before subframe #2 (i.e., in subframe #7 of the previous frame). Subframe #3 of the TDD PCell is used to transmit ACK/NACK for a PDSCH of the FDD SCell received 5 subframes before subframe #3 (i.e., in subframe #8 of the previous frame) and ACK/NACK for a PDSCH of the FDD SCell received 4 subframes before subframe #3 (i.e., in subframe #9 of the previous frame).

Tables 6, 7 and 8 show specific examples of case (ii) of self-scheduling of DL HARQ timing (e.g., "DL association set index") for the FDD SCell in the case of the TDD PCell.

TABLE 6

| TDD PCell U/D configuration | Allowed reference configuration for FDD SCell |
| --- | --- |
| 0 | {0, 1, 2, 3, 4, 5, 6} |
| 1 | {1, 2, 4, 5} |
| 2 | {2, 5} |
| 3 | {3, 4, 5} |
| 4 | {4, 5} |
| 5 | {5} |
| 6 | {1, 2, 3, 4, 5, 6} |

TABLE 7

| TDD PCell U/D configuration | Allowed reference configuration for FDD SCell |
| --- | --- |
| 0 | {2, 4, 5} |
| 1 | {2, 4, 5} |
| 2 | {2, 5} |
| 3 | {4, 5} |
| 4 | {4, 5} |
| 5 | {5} |
| 6 | {2, 4, 5} |

TABLE 8

| TDD PCell U/D configuration | Allowed reference configuration for FDD SCell (2 aggregated cells) | Allowed reference configuration for FDD SCell (more than 2 aggregated cells) |
| --- | --- | --- |
| 0 | 5 | 2 |
| 1 | 5 | 2 |
| 2 | 5 | 2 |
| 3 | 5 | 4 |
| 4 | 5 | 4 |
| 5 | 5 | Not applicable |
| 6 | 5 | 2 |

Hereinafter, multiplexing or bundling of ACKs/NACKs will be described.

In the method of ACK/NACK multiplexing (i.e. ACK/NACK selection) applied to the Rel-8 TDD system, ACK/NACK selection using an implicit PUCCH resource corresponding to a PDCCH for scheduling each PDSCH of a UE (i.e., an implicit PUCCH resource linked to the lowest CCE index) is basically taken into consideration to secure PUCCH resources.

Meanwhile, the LTE-A FDD system considers transmission of a plurality of ACKs/NACKs over one UE-specifically configured UL CC, for a plurality of PDSCHs transmitted over a plurality of DL CCs. To this end, the "ACK/NACK selection" scheme of using an implicit PUCCH resource linked to a PDCCH for scheduling a specific DL CC or some or all DL CCs (i.e. an implicit PUCCH resource linked to the lowest CCE index nCCE or to nCCE and nCCE+1) or using a combination of the implicit PUCCH resource and an explicit PUCCH resource pre-reserved for each UE through RRC signaling is taken into consideration.

The LTE-A TDD system may also take into consideration a situation where a plurality of CCs is aggregated. Transmitting a plurality of ACK/NACK information items/signals for a plurality of PDSCHs, which are transmitted over a plurality of DL subframes and a plurality of CCs, over a specific CC (i.e. A/N CC) in a UL subframe corresponding to the plurality of DL subframes may be taken into consideration. In this case, in contrast with LTE-A FDD, a plurality of ACK/NACK corresponding to the maximum number of CWs which can be transmitted over all CCs allocated to the UE may be transmitted for all the DL subframes (SFs) (i.e. full ACK/NACK), or ACK/NACK bundling may be applied to the CW and/or CC and/or SF domain to reduce the number of ACKs/NACKs to be transmitted (i.e. bundled ACK/NACK). Herein, CW bundling may mean that ACK/NACK bundling for the CWs for the respective CCs is applied to each DL SF. CC bundling may mean that ACK/NACK bundling for all or some CCs is applied to each DL SF. SF bundling may mean that ACK/NACK bundling for all or some DL SFs is applied to the respective CCs.

Meanwhile, the LTE-A system takes into consideration transmitting a plurality of ACK/NACK information items/signals over a specific UL CC for a plurality of PDSCHs transmitted on a plurality of DL CCs. Unlike ACK/NACK transmission using PUCCH format 1a/1b in legacy Rel-8 LTE, the plurality of ACK/NACK information items and/or control signals may be subjected to channel-coding (e.g. Reed-Muller (RM) coding, Tail-biting convolutional coding, etc.), and then transmitted using PUCCH format 2 or PUCCH format 3, which is a variation based on block-spreading.

Herein, the block-spreading technique is a method of modulating control information (e.g. ACK/NACK, etc.) to be transmitted using the SC-FDMA scheme, in contrast with PUCCH format 1 or 2 series in legacy LTE. In this method, a symbol sequence may be spread in the time domain by an orthogonal cover code (OCC) and transmitted. Herein, control signals of multiple UEs may be multiplexed on the same resource block (RB) using the OCC.

Next, a downlink assignment index (DAI) used in the LTE TDD system will be described.

According to the TDD scheme, the number of DL SFs may be set to be greater than the number of UL SFs. In this case, the UE transmits, in one UL SF, an ACK/NACK response to multiple PDSCHs transmitted in multiple DL SFs. However, if the UE misses some of the PDCCHs sent in the multiple DL SFs by an eNB, an error may be produced in generating an ACK/NACK since the UE cannot recognize the fact that PDSCHs corresponding to the missed PDCCHs have been transmitted thereto.

To address this error, the TDD system employs a downlink assignment index (DAI). The DAI included in a PDCCH counts and signals the number of PDSCHs to be transmitted on the ACK/NACK resources of one UL SF. For example, when 3 DL subframes correspond to one UL subframe, PDSCHs transmitted in 3 DL SFs are sequentially indexed (i.e., sequentially counted) and then the DAI is delivered over a PDCCH for scheduling a PDSCH. The UE may recognize whether PDCCHs have been successfully received so far based on the DAI information contained in the PDCCHs.

Figures 13, 14:
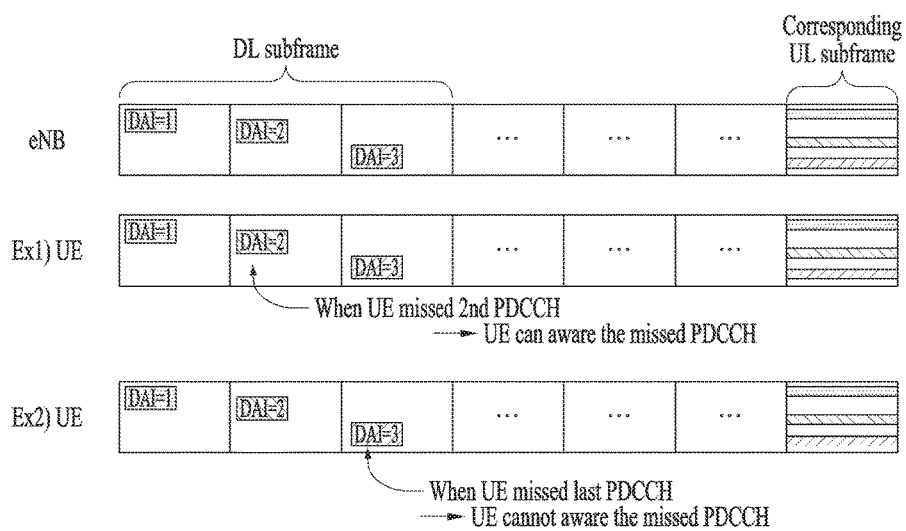
FIG. 13 illustrates the DAI of a PDCCH.
FIG. 14 illustrates resource mapping performed in a case where UCI is piggybacked to a PUSCH.

FIG. 13 illustrates the DAI of a PDCCH.

In Example 1 of FIG. 13, it is assumed that the UE has missed the second PDCCH. The UE may recognize that the second PDCCH is missed since the value of DAI of the third PDCCH, which is the last PDCCH, is not equal to the number of PDCCHs which have been received up to that point. Thereby, the UE may transmit an ACK/NACK.

If the UE misses the last PDCCH as shown in Example 2, the UE is likely to fail to recognize that the last PDCCH has been missed because the value of the DAI is equal to the number of PDCCHs which have been received up to that point. That is, the UE may recognize that only 2 PDCCHs are scheduled therefor during the DL SF period. In this case, the ACK/NACK information is transmitted on the PUCCH resource corresponding to DAI=2 rather than on the PUCCH resource corresponding to DAI=3, and accordingly the eNB may recognize that the UE has missed the PDCCH including DAI=3.

The DAI described above refers to DL DAI. The DAI is delivered to the UE over DL control information (e.g., PDCCH, EPDCCH) indicating PDSCH transmission or DL SPS Release. If the eNB triggers UL transmission of the UE at the transition time of an ACK/NACK, the eNB may transmit UL DAI over DCI corresponding to a UL grant. The UL DAI denotes the accumulated number of PDCCH/EPDCCHs indicating PDSCH or SPS Release which is the object of ACK/NACK reporting within a certain period or denotes, in the case of CA, the number of DL SFs which are the object of ACK/NACK reporting. In the examples of FIG. 13, when the UE having received UL DCI piggybacks an ACK/NACK on a PUSCH based on the UL DAI, the eNB may enable the UE to recognize that the UE has missed the second PDCCH by adding DAI=3 to the UL DCI.

In wireless communication systems such as 3GPP LTE, properties of information are divided into UCI and data on uplink, and a PUCCH, which is a channel for transmission of UCI, and a PUSCH, which is a channel for transmission of data, are designed and utilized according to the properties of the corresponding information. However, in the case where the UE is not configured to transmit the PUCCH and the PUSCH simultaneously, if there is a PUSCH to be transmitted at the time for transmission of the UCI, the UE transmits the UCI, the UCI being piggybacked to the PUSCH.

FIG. 14 illustrates resource mapping performed in a case where UCI is piggybacked to a PUSCH. FIG. 14 assumes normal CP, and UCI may include at least one of HARQ-ACK (e.g., A/N), RI, and CQI/PMI. For simplicity, a case where a PUSCH resource is allocated to 1 RB will be described, but embodiments of the present invention are not limited thereto.

Referring to FIG. 14, the CQI/PMI is subjected to the mapping operation without taking into consideration the resource position of the HARQ-ACK (e.g., A/N). Accordingly, when the HARQ-ACK occupies all SC-FDMA symbols, the CQI/PMI at the same position as the HARQ-ACK is punctured.

As importance of resources to which the UCI is allocated (hereinafter, UCI resource) among the PUSCH resources increases, resources for transmission of data are reduced. Accordingly, in terms of efficient use of resources, as fewer UCI resources as to ensure performance are preferably allocated among the PUSCH resources. In particular, it is preferable in terms of efficiency of utilization of resources that the HARQ-ACK in the UCI is used to report an ACK/NACK for a PDSCH on which DL scheduling has been actually performed. However, in the case as illustrated in FIG. 14, even though the eNB performs DL scheduling on a specific PDSCH, the UE may determine that TB has not been transmitted for reasons such as failure of DCI detection. Accordingly, the HARQ-ACK configuration reported by the UE (e.g., a HARQ-ACK set for a PDSCH detected by the UE) may be different from the HARQ-ACK configuration expected by the eNB (e.g., a HARQ-ACK set for an actually transmitted PDSCH), which is problematic.

For example, suppose that the eNB uses the CA technique to configure 2 DL CCs (e.g., CC1 and CC2) for the UE, and the UE transmits a HARQ-ACK for a PDSCH that the UE has detected. If the UE succeeds only in detecting a PDSCH for CC2 when the eNB transmits PDSCHs on both CC1 and CC2, the UE reports only the HARQ-ACK for the PDSCH transmitted on CC2. On the other hand, the eNB, which expects two HARQ-ACKs for the two PDSCHs, may fail to recognize the CC on which the PDSCH corresponding to the reported HARQ-ACK has been transmitted even if the eNB recognizes, through blind detection, the fact that one HARQ-ACK has been reported.

To address this issue, the LTE system is configured such that the eNB transmits HARQ-ACK feedback (e.g. a codebook or payload size) for all possible PDSCHs on which DL scheduling may be performed. The UE transmits a HARQ-ACK for all possible PDSCHs. If there is no data transmission occurring on a specific PDSCH or the UE fails to detect a PDSCH, DTX is defined and the UE reports the DTX through a HARQ-ACK. Herein, the DTX may be bundled with NACK, and thus the NACK/DTX may be reported as one state. For example, in the LTE system, when the CA technique is applied and HARQ-ACK is transmitted through the PUSCH resources, HARQ-ACK is designed to be reported with respect to a transmittable PDSCH on all CCs configured for the UE by the eNB.

In legacy mobile communication systems (e.g., LTE Rel-10/11/12 system), the CA technique of transmitting DL data to the UE by combining 5 or fewer CCs has been considered, but a massive CA technique enabling 32 (or 16) or fewer CCs to be combined to support DL traffic, which has recently increased drastically, is now under discussion. If the number of CCs configurable for the UE is increased by, for example, the massive CA technique and the UE reports HARQ-ACKs on the assumption that the PDSCH is transmittable on all configured CCs, importance of UCI resources among PUSCH resources increases, and thus the resource region for data transmission will be narrowed.

In addition, as it is expected that most CCs utilized in the massive CA technique will be configured by resources in an unlicensed band and that PDSCH transmission in the unlicensed band will occasionally occur according to the result of sensing of the band, inefficiency of utilization of radio resources may be worsened due to increase of UCI resources among PUSCH resources. For example, if HARQ-ACK resources for all CCs are allocated in consideration of possibility of PDSCH transmission regardless of whether a PDSCH is actually transmitted, inefficient utilization of resources may result because there are many HARQ-ACK resources used for CCs of the unlicensed band, but the frequency of actual transmission of PDSCHs on the CCs of the unlicensed band is low.

UCI Based on CRC of HARQ-ACK

In the following description, it is assumed that HARQ-ACK information is transmitted on PUSCH resources through a UCI piggybacking procedure in implementing UL transmission of a wireless communication system employing the CA technique. According to one embodiment, the UE may adaptively change the size of the UCI payload for HARQ-ACK information according to scheduling.

For simplicity, only examples of operations based on the LTE system will be described. However, embodiments of the present invention are not limited thereto. The examples may also be applied to other wireless communication systems. Indexes assigned in the embodiments are simply illustrative, and an independent invention is not essentially configured for each index. Embodiments having different indexes may configure one invention.

Embodiment 1

The UE may determine whether or not to add CRC for HARQ-ACK feedback based on at least one of the conditions in Table 9 below.

TABLE 9

☐ The number of configured CCs is greater than or equal to $N_0$.
☐ The size of the UCI payload for HARQ-ACK feedback is greater than or equal to $B_0$ with respect to configured CCs.
☐ The coding rate of UCI for HARQ-ACK feedback is greater than or equal to $R_0$ with respect to configured CCs.
☐ A signal (e.g., a higher layer signal) indicating whether or not a CRC bit is added is received from a network (or an eNB).

For example, if at least one of conditions ① to ④ of Table 9 is satisfied, the UE may calculate CRC and concatenate the same with HARQ-ACK feedback information.

When the UE performs CSI feedback on a PUSCH through the UCI piggybacking procedure in the CA operation of the current LTE system, in which 5 or fewer CCs are combined, if the UCI payload size of CQI/PMI is greater than or equal to a certain size (e.g., 11 bits), the UE adds, to the CQI/PMI, a CRC bit calculated using a CRC operation circuit (or a CRC polynomial). However, for the HARQ-ACK feedback, the payload size of UCI corresponding to HARQ-ACK is sufficiently small, and thus CRC is not added for HARQ-ACK feedback.

However, if the massive CA technique utilizing a large number of CCs (e.g., 32 CCs) is introduced, UCI payload size for HARQ-ACK will increase. Accordingly, the eNB may need to determine the error status of HARQ-ACK transmitted from the UE. To determine the error status of the HARQ-ACK, the UE may add a CRC bit obtained with the CRC operation circuit to the UCI for HARQ-ACK and transmit the UCI.

If the UCI payload size for HARQ-ACK is small, it is inefficient to add the CRC bit. Accordingly, a criterion for determining when to add the CRC bit for HARQ-ACK needs to be defined.

According to an embodiment of the present invention, whether to add CRC may be determined based on the number of CCs configured for the UE, the UCI payload size corresponding to the CCs configured for the UE, or the UCI coding rate, as shown in Table 9. Alternatively, the eNB may instruct, through a higher layer signal, the UE to add the CRC bit.

If the CRC bit is added, the UE adds, to the UCI, the CRC bit calculated with the CRC operation circuit, and then performs coding on the entirety of the UCI and CRC bit. Thereafter, the UE reports the coded bit to the eNB through the UCI piggybacking procedure. For example, if the size of UCI payload (e.g., payload corresponding to HARQ-ACK) calculated with respect to CCs currently configured for the UE is greater than 22 bits, the CRC bit may be attached to the HARQ-ACK.

Embodiment 2

The UE may perform HARQ-ACK feedback by piggybacking UCI on a PUSCH resource. In an environment where the CRC bit is added to the UCI for HARQ-ACK, a network (or the eNB) may configure a cell-group (CG) set consisting of a plurality of CGs (e.g., $CG_1, CG_2, \ldots, CG_N$) for the UE. The UE selects the smallest CG CG (e.g., $CG_k$, $k \in \{1, 2, \ldots, N\}$) including cells actually scheduled therefor from the CG set. The UE may add the CRC bit to the UCI for the selected CG and perform HARQ-ACK feedback. The size of a CG may be represented by, for example, the number of cells included in the CG or the size of HARQ-ACK payload generated based on the CG. However, embodiments of the present invention are not limited thereto.

When the UE performs HARQ-ACK feedback on a PUSCH resource through the UCI piggybacking procedure, only HARQ-ACK information for the actually scheduled CCs (e.g., CCs on which PDSCH transmission is performed) is meaningful. However, if the UE is configured to perform HARQ-ACK feedback only for the scheduled CCs (e.g., CCs on which the PDSCH is received), the UE may incorrectly recognize CCs actually scheduled by the eNB for reasons such as missing of DCI. Thereby, the UE may perform HARQ-ACK feedback for a CC combination different from the CC combination expected by the eNB, which is problematic. In this case, the eNB has difficulty detecting the HARQ-ACK information transmitted by the UE.

To address this issue, a CRC bit may be added to the UCI for HARQ-ACK as disclosed in Embodiment 1. The eNB may detect at least the UCI payload size of the HARQ-ACK information transmitted by the UE, based on the CRC check value.

According to an embodiment, a specific value of the UCI payload size for HARQ-ACK may correspond to a specific CC combination. For example, if the UCI payload for HARQ-ACK has a first size value, the UCI payload may be HARQ-ACK for a first CC combination. If the UCI payload for HARQ-ACK has a second size value, the UCI payload may be HARQ-ACK for a second CC combination.

The UE may configure UCI payload only with HARQ-ACK information for CCs which are determined to be actually scheduled, and then transmit the same with the CRC bit added thereto. For example, if PDSCH is received only on $\{CC_1, CC_3 \ldots CC_x\}$, the UE determines the UCI payload size based on the value corresponding to the corresponding CC combination, and transmits HARQ-ACK feedback by adding CRC. The eNB detects the size of a UCI payload having the CRC check value (e.g., the remaining value) set to 0 through the CRC check procedure. Thereby, the eNB may recognize the CC combination for which the UCI payload size of the HARQ-ACK information transmitted by the UE is given.

If the UE is allowed to configure UCI payload for a HARQ-ACK with respect to any CC combination, complexity of detection of the UCI payload size in the eNB may increase. For example, when only $\{CC_1, CC_2\}$ is defined to be usable as a combination of two CCs, the eNB may specify the CC combination $\{CC_1, CC_2\}$ by detecting the UCI payload size. However, if the UE is allowed to use $\{CC_1, CC_2\}, \{CC_1, CC_3\} \ldots, \{CC_1, CC_x\}$ as combinations of two CCs, the eNB may have difficulty recognizing a CC combination forming the basis on which the UE feeds back HARQ-ACK, even if the eNB detects the UCI payload size.

Accordingly, it is proposed in this embodiment that the eNB pre-configure a CG set consisting of a plurality of CGs for the UE. The UE selects a CG having the smallest size that includes all cells scheduled therefor from the configured CG set. The UE may add a CRC bit to the UCI for the selected CG to transmit HARQ-ACK feedback.

Figure 15:
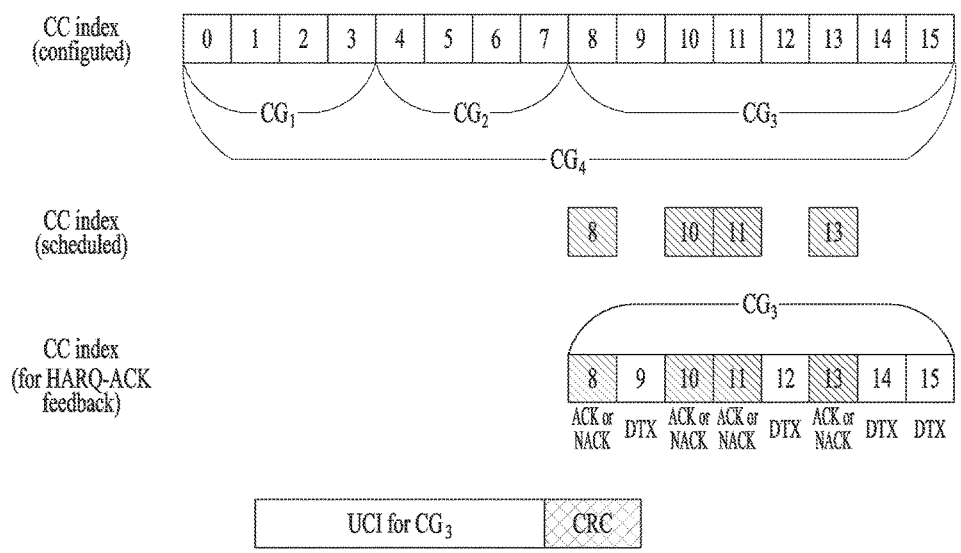
FIG. 15 illustrates a method of configuring a CG set and selecting a CG according to an embodiment of the present invention.

FIG. 15 illustrates a method of configuring a CG set and selecting a CG according to an embodiment of the present invention. It is assumed that the CA technique is applied to 16 CCs and that 4 CGs are configured for the UE. For example, the 4 CGs include $CG_1=\{CC_0, CC_1, CC_2, CC_3\}$, $CG_2=\{CC_4, CC_5, CC_6, CC_7\}$, $CG_3=\{CC_8, CC_9, CC_{10}, CC_{11}, CC_{12}, CC_{13}, CC_{14}, CC_{15}\}$, and $CG_4=\{CC_0, CC_1, CC_2, CC_3, CC_4, CC_5, CC_6, CC_7, CC_8, CC_9, CC_{10}, CC_{11}, CC_{12}, CC_{13}, CC_{14}, CC_{15}\}$.

If the eNB performs scheduling for $CC_8, CC_{10}, CC_{11}$, and $CC_{13}$ among 16 CCs, the UE selects $CG_3$, which is a CG having the smallest number of elements including $CC_8$, $CC_{10}$, $CC_{11}$, and $CC_{13}$ for which scheduling has been performed. The UE configures UCI with HARQ-ACK information for all CCs in $CG_3$, and adds a CRC bit thereto. Then, the UE feeds back the UCI to the eNB. Thereafter, the eNB detects the size of UCI payload having the CRC check value set to 0 through CRC check. The eNB may infer from the detected UCI payload size that the UE has performed HARQ-ACK feedback for $CG_3$.

Embodiment 3

When Embodiment 2 is applied, the network (or the eNB) may additionally configure different CRC masks for the respective CGs to distinguish between CGs having the same HARQ-ACK payload size in the CG set. When performing HARQ-ACK feedback for a corresponding CG, the UE may scramble the CRC bit of HARQ-ACK with a CRC mask (i.e., XOR operation on a bit-by bit basis) and then transmit the HARQ-ACK.

According to Embodiment 2, the eNB configures a CG set including a plurality of CGs for the UE, and the UE performs HARQ-ACK feedback for a specific CG in the CG set. The eNB may detect the UCI payload size through the CRC check, and infer, from the UCI payload size, the CG for which HARG-ACK information has been transmitted. However, if different CGs have the same UCI payload size, it may be difficult for the eNB to determine the CG for which HARG-ACK information has been fed back by the UE, even if the UCI payload size is detected through the CRC check because there are multiple CGs corresponding to the UCI payload size.

Accordingly, in this embodiment, it is proposed that different CRC masks be additionally configured to distinguish between CGs having the same UCI HARQ-ACK payload size. The UE may scramble the CRC bit through a CRC mask in performing HARQ-ACK feedback for the corresponding CG.

Figure 16:
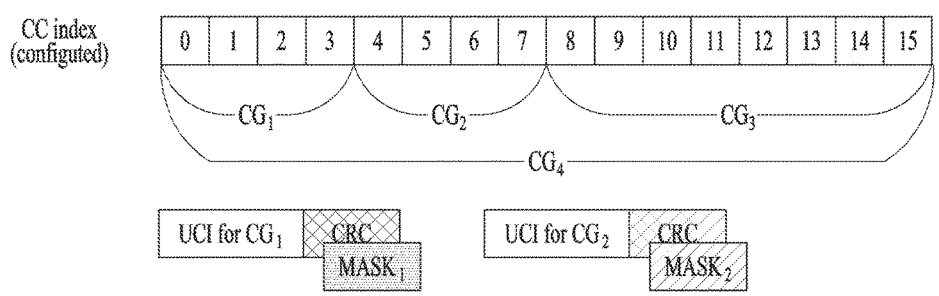
FIG. 16 is a diagram illustrating CRC masks for respective CGs according to an embodiment of the present invention.

FIG. 16 is a diagram illustrating CRC masks for respective CGs according to an embodiment of the present invention. It is assumed that HARQ-ACKs have the same UCI payload size for $CG_1$ and $CG_2$, and different CRC masks $MASK_1$ and $MASK_2$ are used for $CG_1$ and $CG_2$.

Upon receiving HARQ-ACK feedback for $CG_1$ or $CG_2$ from the UE, the eNB performs decoding on the assumption of a UCI payload size corresponding to $CG_1$ or $CG_2$. The eNB calculates the CRC check value through the CRC check procedure, and performs de-scrambling (i.e., XOR operation on a bit-by-bit basis) with the CRC masks (e.g., $MASK_1$ and $MASK_2$) for $CG_1$ and $CG_2$. When the CRC check value becomes 0 through de-scrambling with $MASK_1$, the eNB determines that a HARQ-ACK for $CG_1$ has been transmitted. When the CRC check value becomes 0 through de-scrambling with $MASK_2$, the eNB determines that a HARQ-ACK for $CG_2$ has been transmitted.

Embodiment 4

If DAI signaling (e.g., CC domain DAI signaling) indicating the order of scheduled CCs is used, the eNB may indicate a CG set (e.g., $CG_1, CG_2, \ldots, CG_N$) with order information about the scheduled CCs (i.e., the value indicated by the DAI field). The UE may select the smallest CG (e.g., $CG_k$, $k \in \{1, 2, \ldots, N\}$) including cells scheduled therefor among the CGs in a CG set configured therefor, and perform HARQ-ACK feedback by adding a CRC bit to the UCI for the selected the CG.

When the eNB configures a CG for HARQ-ACK feedback based on the CC index as described in Embodiment 2 or 3, the number of CCs in the CG configured for HARQ-ACK feedback may be greater than the number of CCs actually scheduled by the eNB, and HARQ-ACK for CCs which are not actually scheduled may be fed back, thereby unnecessarily increasing UCI payload. For example, in the example of the CG configuration of FIG. 15, if the eNB schedules CCs assigned 4, 5 and 8 as CC indexes, the UE will select $CG_4$ as the smallest CG including these CCs, and perform HARQ-ACK feedback for 13 CCs which are not scheduled among the 16 CCs. The eNB may preconfigure more various CC combinations to address this issue. In this case, however, as the number of configured CC combinations increases, the number of candidate groups of UCI payload size that the eNB should detect through blind detection (BD) also increases, thereby increasing implementation complexity.

Accordingly, in this embodiment, the eNB may perform (CC domain) DAI signaling for announcing order information about the scheduled CCs, and a CG may be configured with information (e.g., DAI index) indicating the order of the scheduled CCs. More specifically, when PDSCH transmission occurs for a specific CC, DAI signaling may indicate the sequential position of the specific CC among all the scheduled CCs. The DAI signaling may be understood as mapping the CC indexes to the DAI indexers according to scheduling.

Figure 17:
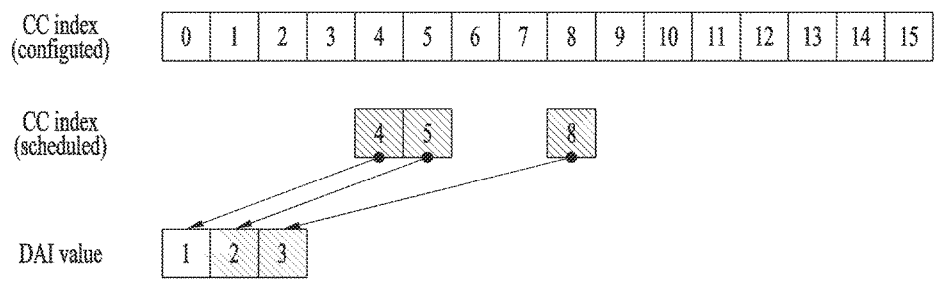
FIG. 17 illustrates DAI signaling according to an embodiment of the present invention.

FIG. 17 illustrates DAI signaling according to an embodiment of the present invention. Suppose that there are 16 CCs in total, and CCs assigned CC indexes 4, 5 and 8 are scheduled. The CCs assigned CC indexes 4, 5 and 8 may correspond to DAI values 1, 2 and 3, respectively according to the scheduling order.

The UE may recognize the number of scheduled CCs through the DAI value delivered from the eNB. The UE may add a CRC bit to UCI corresponding to the scheduled CCs to adaptively perform HARQ-ACK feedback.

In this case, to lower UCI detection complexity, the eNB may preconfigure CGs for the UE based on the DAI value, and the UE may perform HARQ-ACK feedback for the smallest CG including cells scheduled therefor. Preferably, the CGs configured based on the DAI value have a nested structure.

Figure 18:
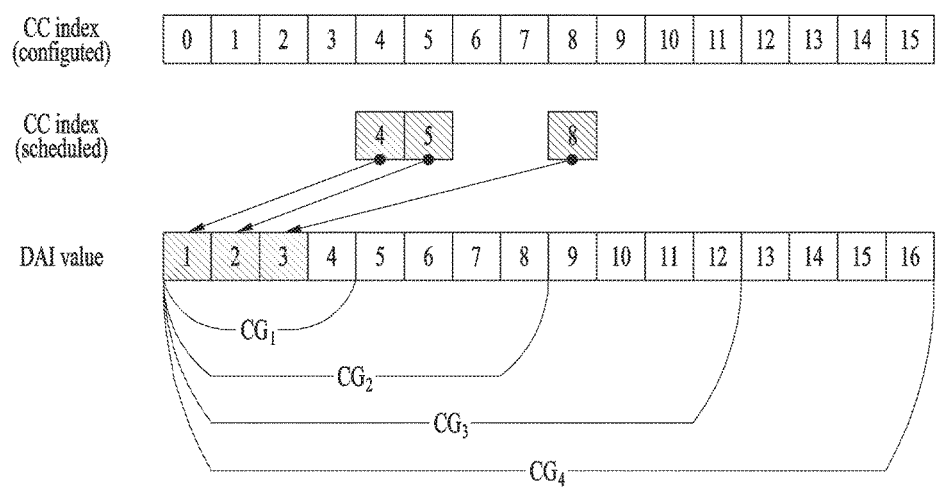
FIG. 18 illustrates a CG having a nested structure according to an embodiment of the present invention.

FIG. 18 illustrates a CG having a nested structure according to an embodiment of the present invention. FIG. 18 shows a nested CG structure in a unit of 4 CCs based on the DAI value.

Figure 19:
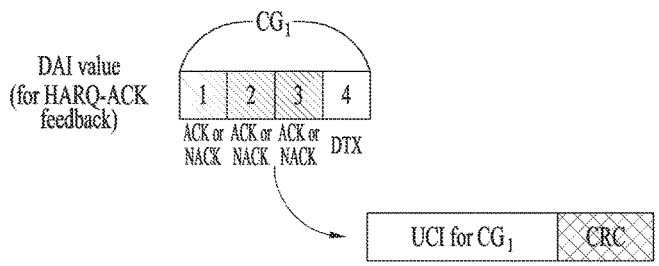
FIG. 19 illustrates UCI payload configured based on FIG. 18.

FIG. 19 illustrates UCI payload configured based on FIG. 18.

The UE may configure UCI payload for CCs corresponding to $CG_1$. For a DAI value (e.g., DAI=4) which is not actually scheduled, UCI payload preconfigured by the eNB is calculated.

Embodiment 5

According to an embodiment, a virtual CC index set consisting of N virtual CC indexes may be configured. For 2 points $i_S$ and $i_E$ in the virtual CC index set, the UE configures a UCI payload with HARQ-ACK information for a series of CCs having CC indexes starting from $i_S$ and ending before $i_E$. $_NC_2$ CRC masks matched with virtual CC index pairs configured with ($i_S$, $i_E$) in the manner of one-to-one correspondence may be defined and applied to a CRC bit.

If CC domain DAI signaling for announcing the order information about the scheduled CCs is used, a CG may be configured based on the DAI value without restriction on the scheduling as in the case of Embodiment 4, and the UCI payload size for HARQ-ACK feedback may be adaptively adjusted, which is advantageous.

However, to use CC domain DAI signaling, a new bit field for the legacy DL grant may need to be added. Thereby, signaling overhead of control information may increase.

In this embodiment, a method for a UE to deliver, through a CRC mask, information about a CC combination selected to adaptively adjust the UCI payload without causing increase in overhead of DAI signaling is proposed.

Specifically, the eNB configures a CC index set consisting of N virtual CC indexes (e.g., $i_1$, $i_2$, $i_3$, . . . , $i_N$) for the UE. The UE select 2 points (e.g., $i_S$ and $i_E$) in the CC index set. The UE sets the UCI payload size using HARQ-ACK information for a series of CCs arranged from CC index $i_S$ and before CC index $i_E$. Thereafter, the UE adds a CRC bit, and applies a CRC mask corresponding to the pair ($i_S$, $i_E$) predefined by the eNB to the CRC bit to perform HARQ-ACK feedback.

Figure 20:
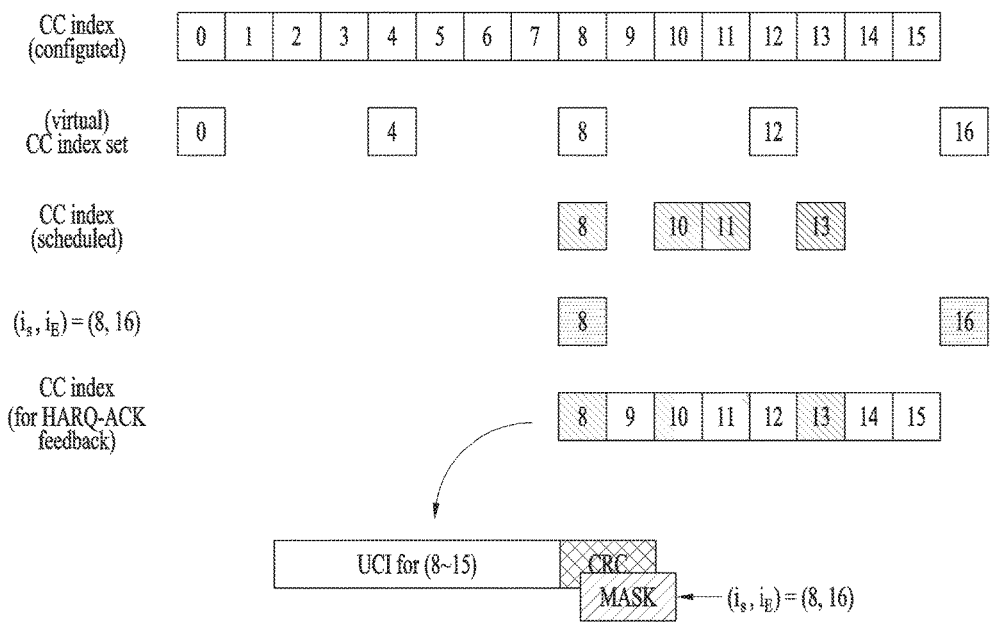
FIG. 20 is a diagram illustrating HARQ-ACK feedback based on virtual CC indexes according to an embodiment of the present invention.

FIG. 20 is a diagram illustrating HARQ-ACK feedback based on virtual CC indexes according to an embodiment of the present invention. Referring to FIG. 20, a CC index set of {0, 4, 8, 12, 16} is configured for 16 CCs. CC index 16 is a virtual CC index. The CC index 16 does not correspond to any CC, but is introduced to indicate a series of CCs.

The eNB schedules CCs assigned CC indexes of 8, 10, 11 and 13 among the 16 CCs. The UE selects a CC index pair ($i_S$, $i_E$)=(8, 16) to include scheduled CCs, and configures a UCI payload with HARQ-ACK information for CCs included in CC indexes {8, 9, 10, 11, 12, 13, 14, 15}.

The eNB preconfigures CRC masks corresponding to $_5C_2$ CC index pairs ($i_S$, $i_E$) for the UE. The UE applies a CRC mask corresponding to the actually selected CC index pair (8, 16) in the HARQ-ACK feedback procedure.

Embodiment 6

The eNB configures input bits of channel coding for the UE by quantizing the input bits into L levels. The UE selects the quantization value of the lowest input bit of the L levels which is greater than the UCI payload for a CC combination selected for HARQ-ACK feedback based on the scheduling information. The UE adds, to the UCI payload, a padding bit obtained by subtracting the UCI payload from the quantization value of the selected input bit, thereby generating a padded UCI payload having the length of the quantization value of the selected input bit. The UE may add a CRC bit generated through the CRC operation circuit to the padded UCI payload to perform channel coding.

In Embodiments 2, 3, 4 and 5, the UE adaptively calculates UCI payload corresponding to scheduled CCs, assuming that a specific CC combination has been scheduled among a plurality of CC combinations. Herein, the eNB should pre-calculate the UCI payloads for possible CC combinations in order to perform detection and coding of the UCI payloads in the subsequent HARQ-ACK feedback procedure. However, since the amount of HARQ-ACK information for each CC varies with the number of TBs of each CC, the adaptive UCI payload according to CC combinations is highly variable, and implementation complexity of the eNB may be raised.

Accordingly, in this embodiment, input bits of channel coding are quantized into L levels such that final coded bits are calculated as L values preconfigured by the eNB. The UE may select the quantization value of the lowest input bit of the L levels which is greater than the sum of a CC combination determined to be scheduled and the UCI payload. The UE may add, to the UCI payload, a padding bit obtained by subtracting the sum of the UCI payload and the CRC bit from the selected input bit, thereby generating A padded UCI payload. The UE generates and adds a CRC bit by applying the CRC operation circuit to the padded UCI payload, and performs channel coding. After channel coding, the UE transmits a coded symbol to the eNB.

Figure 21:
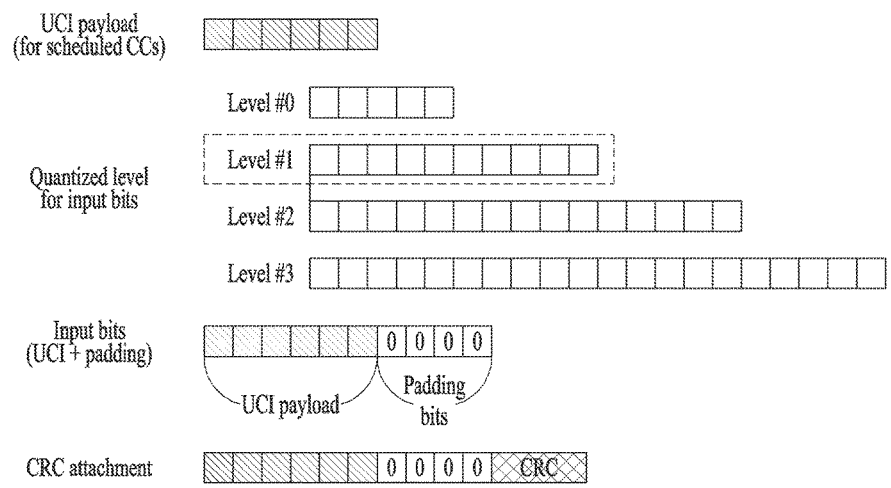
FIG. 21 illustrates a method of performing HARQ-ACK feedback based on quantized input bits of channel coding according to an embodiment of the present invention.

FIG. 21 illustrates a method of performing HARQ-ACK feedback based on quantized input bits of channel coding according to an embodiment of the present invention.

Referring to FIG. 21, the input bits of channel coding for HARQ-ACK are quantized into 4 levels. The UE selects one of the 4 levels according to the number of scheduled CCs. For simplicity, it is assumed that 6 CCs are scheduled and the UE selects Level #1. The number of input bits of Level #1 is 10, and the UCI payload size corresponding to the scheduled CCs is 6. Therefore, the UE pads the UCI payload with 4 bits.

According to this embodiment, a candidate group of the number of coded symbols is limited to a specific value, and thus detection complexity on the eNB may be lowered. This embodiment is applicable to Embodiments 2, 3, 4 and 5 described above.

Embodiment 7

The UE may perform HARQ-ACK feedback by piggybacking UCI on PUSCH resources. The UE may add a CRC bit to the UCI for HARQ-ACK, and may change the channel coding scheme according to the quantity of bits which is the sum of UCI payload and the CRC bit.

If the UCI payload size (e.g., HARQ-ACK payload size) calculated based on the CCs configured as described in Embodiment 1 is greater than a specific number of bits (e.g. 22 bits), and the UCI payload size for HARQ-ACK feedback is variable as in the cases of Embodiments 2 to 6, the CRC bit may be invariably added. In other words, whether or not to add the CRC bit may be determined depending on whether the UCI payload size calculated based on the CCs exceeds a specific number of bits (e.g. 22 bits). If the CRC bit is determined to be added, the UE may add the CRC bit even if UCI payload adaptation is performed according to the scheduling information. This is intended to allow the eNB to easily detect the UCI payload size varying according to UCI payload adaptation.

In addition, the coding scheme may switch between tail-biting convolutional coding (TBCC) and RM coding according to the UCI payload size. Switch between the coding schemes may be performed based on the size equal to the sum of the UCI (e.g. HARQ-ACK) payload size and the CRC bit. For example, if the UCI payload size included in CRC is greater than 22 bits, the TBCC may be employed. If the UCI payload size is less than 22 bits, RM may be employed.

Specifically, when the UCI payload size for HARQ-ACK feedback varies as in the cases of Embodiments 2 to 6, employing a proper channel coding scheme according to the UCI payload size may be needed. For example, in the legacy LTE system, the RM code is typically applied to UCI for HARQ-ACK. However, if the size of the UCI payload increases, TBCC code without restriction on the length of the input bit may be more suitable.

If the CRC bit is added to the UCI as in the case of Embodiment 1, switch between the channel coding schemes may be performed based on the bit sum of the UCI payload and the CRC bit.

Alternatively, if a padding bit is added to the UCI payload to have a specific input bit length as in the case of Embodiment 6, switch between the channel coding schemes may be performed based on the sum of the padded UCI payload and the CRC bit.

Embodiment 8

If the size of HARQ-ACK payload to be UCI-piggybacked to the PUSCH is greater than or equal to X bits, CRC is applied. If the size is less than X bits, CRC may not be applied. In this case, if the HARQ-ACK payload size (for the configured CCs) is less than X bits, UL DAI is included in the DCI. If the HARQ-ACK payload size is greater than or equal to X bits, UL DAI may not be included in the DCI. As described above, applying CRC means adding a CRC bit.

To lower CRC overhead, determining whether to apply CRC depending on the payload size of HARQ-ACK transmitted on the PUSCH is more preferable than invariably applying CRC. For example, if the HARQ-ACK payload size is small, the UE may not apply CRC, determining that the eNB may detect DTX through blind the code. If the HARQ-ACK payload size is large, the UE may apply CRC to ensure a probability of DTX detection of the eNB.

If the CRC is applied, the eNB may determine CCs on which the UE has transmitted UCI, in a manner as disclosed in Embodiment 4. On the other hand, if the CRC is not applied, it is difficult for the eNB to detect the UCI payload size, and thus the eNB may indicate information about the UCI payload to be piggybacked to the PUSCH to the UE through UL DAI signaling.

Alternatively, the eNB may be invariably configured not to transmit UL DAI signaling to the UE. In this case, the UE may set the minimum HARQ-ACK payload size to be greater than or equal to X bits on which CRC is applicable. For example, even if the UE has no CC actually scheduled therefor, the UE may generate a HARQ-ACK payload according to the minimum HARQ-ACK payload size, and perform UCI piggyback by applying the RC.

Embodiment 9

If the HARQ-ACK payload is less than or equal to X bits, the UE may not apply CRC. If the HARQ-ACK payload exceeds X bits, the UE may apply CRC. In performing UCI piggyback, if Y bits of the HARQ-ACK payload is less than or equal to X bits, the UE may pad the final HARQ-ACK payload size (or HARQ-ACK codebook size) up to X bits and transmit HARQ-ACK. For example, from the perspective of the UE, NACK/DTX may be mapped to the remaining (X-Y) bits other than the bits of the HARQ-ACK payload. In addition, if Y bits are more than X bits, the UE may perform an additional quantization procedure for the HARQ-ACK payload based on the embodiments are described above, and then transmit the HARQ-ACK payload by applying CRC.

For example, if the HARQ-ACK payload is less than or equal to 22 bits, the UE may not apply CRC. If the HARQ-ACK payload exceeds 22 bits, the UE may apply CRC. In this case, if CRC is not applied, the eNB may detect the HARQ-ACK payload size (or HARQ-ACK codebook size), which is received through the PUSCH, through blind detection (BD) and CRC check. However, if CRC is not applied, it may be difficult for the eNB to detect the HARQ-ACK payload size (or HARQ-ACK codebook size).

As one method to address this issue, if the HARQ-ACK payload size calculated by the UE is less than or equal to 22 bit, the UE may pad the final HARQ-ACK payload size (or HARQ-ACK codebook size) up to 22 bits which are the boundary value of the HARQ-ACK payload size to which CRC is not applied.

Embodiment 10

The eNB may provide the UE with whole HARQ-ACK payload information subjected to UCI piggyback through UL DAI. In this case, some of the states of UL DAI may be configured to indicate the number of PDSCHs (or the number of TBs) for calculation of HARQ-ACK payload, and the other state(s) may be configured to indicate that the HARQ-ACK payload is greater than or equal to X bits.

CRC may or may not be applied depending on the HARQ-ACK payload size as in the case of Embodiment 8. If CRC is applied to the HARQ-ACK payload, the utility of the UL DAI may be low. Accordingly, UL DAI signaling may be used to indicate the number of PDSCHs (or the number of TBs) for calculation of the HARQ-ACK payload when CRC is not applied to the HARQ-ACK payload.

If CRC is applied to HARQ-ACK payload, the UL DAI may not be used or may be configured at the lowest level. For example, one state which may be indicated by the UL DAI field may be matched with a case where the HARQ-ACK payload is greater than or equal to X bits, and the CRC may be configured to be applied when the HARQ-ACK payload is greater than or equal to X bits. The remaining states of the UL DAI may be used to indicate the number of PDSCHs (or the number of TBs) for calculation of HARQ-ACK payload when the HARQ-ACK payload is less than X bits.

In Embodiments 1 to 10, the HARQ-ACK payload size may include a payload (hereinafter, count-less payload) for PDSCHs, TBs or scheduling which is not counted by the DL DAI. For example, in Embodiment 6, the UE may sum the HARQ-ACK payload for PDSCHs which the UE determines to have been scheduled therefor and the count-less payload, and then perform quantization for the whole UCI payload.

Figure 22:
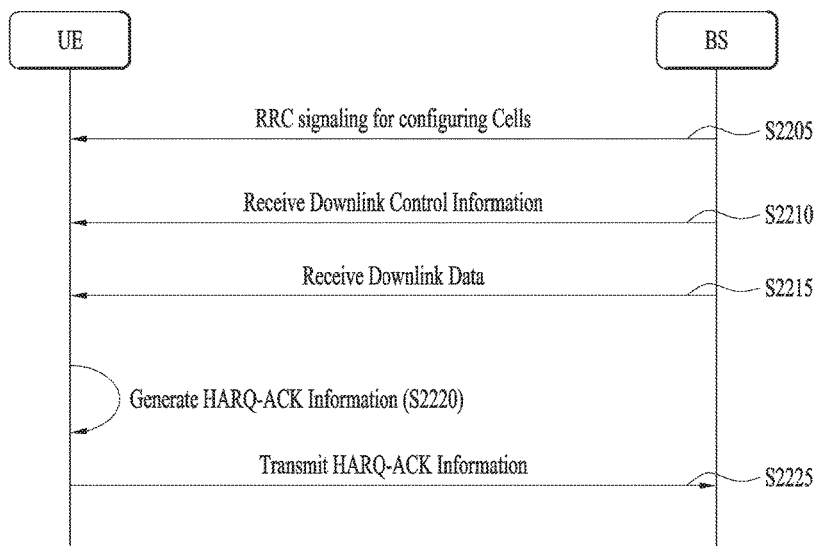
FIG. 22 is a flowchart illustrating a method of transmitting and receiving uplink control information according to an embodiment of the present invention.

FIG. 22 is a flowchart illustrating a method of transmitting and receiving uplink control information according to an embodiment of the present invention. Description of the elements already described above will be omitted.

Referring to FIG. 22, the UE receives configuration of multiple cells from the eNB (S2205). The multiple cells and may include not only cells in the licensed band but also cells in the unlicensed band. The multiple cells may be configured through an RRC reconfiguration message.

The UE receives DL control information from the eNB (S2210), and receives DL data based on the DL control information (S2215). For example, the DL control information may be received through a PDCCH or EPDCCH, and the DL data may be received through a PDSCH. The DL control information and the DL data may be received through the same cell or different cells. For simplicity, the DL control information and/or DL data are illustrated as being received once. However, it will be appreciated by those of skill in the art that the DL control information and/or DL data may be received from multiple cells configured for the UE.

The UE generates HARQ-ACK information about the received DL data (S2220). According some embodiments, other UCI information, for example, CSI (e.g., CQI, RI, PMI) may also be generated in addition to the HARQ-ACK information.

The HARQ-ACK information may be generated for one of multiple cell-groups configured based on multiple cells. For example, the multiple cells may be grouped into multiple cell-groups. A cell group may be a unit of report on HARQ-ACK or a unit of HARQ-ACK payload. For example, the multiple cell groups may be configured to have different HARQ-ACK payload sizes. The multiple cell groups may have a nested structure.

To generate HARQ-ACK information, the UE may select one of the multiple cell-groups. The selected cell-group may be a cell-group that includes all cells through which the data has been received and has the smallest size among the multiple cell-groups. Alternatively, a cell-group may be selected based on a downlink assignment index (DAI) included in DL control information for scheduling DL data. For example, the selected cell-group may be a cell group that has the smallest size among cell-groups each of which includes more than the number of cells indicated by the DAI value.

A cell-group selected for generation of HARQ-ACK information may be indicated through cyclic redundancy check (CRC) attached to the HARQ-ACK information. Different cell-groups having the same number of cells among the multiple cell-groups may be distinguished from each other by applying a cell-group specific CRC mask to the CRC of the HARQ-ACK information. The CRC may be attached to the HARQ-ACK information when the number of multiple cells configured for the UE is greater than or equal to a first threshold, the payload of the HARQ-ACK information is greater than or equal to a second threshold, or the coding rate of the HARQ-ACK information is greater than or equal to a third threshold.

The UE may perform channel coding on the payload of the HARQ-ACK information and the CRC attached to the payload. The channel coding scheme may be determined according to the size equal to the sum of the payload the HARQ-ACK information and the CRC.

The UE transmits UCI including the HARQ-ACK information to the eNB (S2225). Although the UCI may be transmitted through a PUCCH, it is assumed in this embodiment that the UCI is piggybacked to a PUSCH resource when it is transmitted. The UE may also transmit UL data over the PUSCH, but description of the UL data will be omitted in order not to obscure the subject matter.

Figure 23:
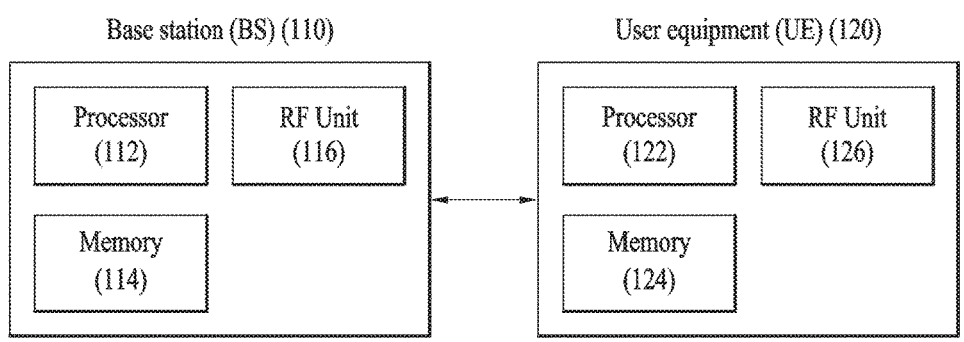
FIG. 23 is a diagram illustrating a base station and a user equipment which are applicable to an embodiment of the present invention.

FIG. 23 is a diagram illustrating a base station and a user equipment which are applicable to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 23, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Embodiments of the present invention are applicable to various wireless communication systems including the 3GPP LTE system.

As apparent from the above description, the present invention has effects as follows.

According to an embodiment of the present invention, the UE may address waste or shortage of data resources according to UCI piggybacking by adaptively selecting a cell-group for reporting HARQ-ACK information based on scheduling by a BS. Further, complexity of processing for detecting HARQ-ACK payload on the side of the BS may be reduced by indicating the information about adaptively selected cell-group through CRC of HARQ-ACK.

The effects that can be obtained from the present invention are not limited to the aforementioned effects, and other effects may be clearly understood by those skilled in the art from the descriptions given below.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting uplink control information by a user equipment (UE) in which a plurality of cells are configured, the method comprising:

receiving, by the UE, downlink data through at least one cell of the plurality of cells;

selecting, by the UE, one cell-group from a plurality of cell-groups, such that the at least one cell, through which the downlink data is received, is entirely included in the selected cell-group;

determining, by the UE, a payload length of hybrid automatic repeat and request (HARQ)-acknowledgement (ACK) information in accordance with the selection of the cell-group;

attaching, by the UE, a cyclic redundancy check (CRC) indicating the selected cell-group to the HARQ-ACK information when the payload length of the HARQ-ACK information is longer than 22-bits; and transmitting the HARQ-ACK information by piggybacking the HARQ-ACK information to a physical uplink shared channel (PUSCH), wherein a cell-group indexed as "i" is completely included in a cell-group indexed as "(i+1)", where "i" is positive integer smaller than a total number of the plurality of cell-groups, and wherein, when the at least one cell through which the downlink data is received belongs to two or more cell-groups among the plurality of cell groups, the UE selects a lowest indexed cell-group having a smallest number of cells among the two or more cell-groups.

2. The method according to claim 1, wherein different cell-groups having a same number of cells among the plurality of cell-groups are distinguished from each other by applying a cell-group specific CRC mask to the CRC of the HARQ-ACK information.

3. The method according to claim 1, wherein the one cell-group is selected based on a downlink assignment index (DAI) included in downlink control information for scheduling the downlink data.

4. The method according to claim 3, wherein the one cell-group is a cell-group having a smallest number of cells among cell-groups having at least "N" cells, where "N" is a number indicated by a value of the DAI.

5. The method according to claim 1, wherein a channel coding scheme is determined based on a sum of the payload length of the HARQ-ACK information and a length of the CRC.

6. A user equipment (UE) in which a plurality of cells are configured, comprising:

a receiver configured to receive downlink data through at least one cell of the plurality of cells;

a processor operatively connected to the receiver, the processor being configured to:

select one cell-group from a plurality of cell-groups, such that the at least one cell through which the downlink data is received is entirely included in the selected cell-group, determine a payload length of hybrid automatic repeat and request (HARQ)-acknowledgement (ACK) information in accordance with the selection of the cell-group, and attach a cyclic redundancy check (CRC) indicating the selected cell-group to the HARQ-ACK information when the payload length of the HARQ-ACK information is longer than 22-bits; and a transmitter operatively connected to the processor, the transmitter being configured to transmit the HARQ-ACK information by piggybacking the HARQ-ACK information to a physical uplink shared channel (PUSCH), wherein a cell-group indexed as "i" is completely included in a cell-group indexed as "(i+1)", where "i" is positive integer smaller than a total number of the plurality of cell-groups, and wherein, when the at least one cell through which the downlink data is received belongs to two or more cell-groups among the plurality of cell groups, the UE selects a lowest indexed cell-group having a smallest number of cells among the two or more cell-groups.

* * * * *